United States Patent
Kuypers

(10) Patent No.: US 6,578,024 B2
(45) Date of Patent: Jun. 10, 2003

(54) HIERARCHICAL RELATIONAL DEFINITION SYSTEM FOR DEFINING AN OBJECT AND METHOD THEREFOR

(76) Inventor: Johannes Antonius Kuypers, 35 Grose Street, Leura, New South Wales (AU), 2781

( * ) Notice: Subject to any disclaimer, the term of this patent is extended or adjusted under 35 U.S.C. 154(b) by 0 days.

(21) Appl. No.: 09/355,253

(22) PCT Filed: Jan. 23, 1998

(86) PCT No.: PCT/AU98/00038
§ 371 (c)(1),
(2), (4) Date: Nov. 5, 1999

(87) PCT Pub. No.: WO98/33134
PCT Pub. Date: Jul. 30, 1998

(65) Prior Publication Data
US 2002/0091660 A1 Jul. 11, 2002

(30) Foreign Application Priority Data
Jan. 24, 1997 (AU) .......................... PO 4761

(51) Int. Cl.[7] ................ G06F 17/30; G06F 7/00
(52) U.S. Cl. ................................ 707/1; 705/7
(58) Field of Search ................ 707/1; 705/7–11

(56) References Cited

U.S. PATENT DOCUMENTS

| | | | |
|---|---|---|---|
| 4,972,318 A | * 11/1990 | Brown et al. | 364/403 |
| 5,432,904 A | 7/1995 | Wong | 705/4 |
| 5,570,291 A | * 10/1996 | Dudle et al. | 364/486.01 |
| 6,092,050 A | * 7/2000 | Lungren et al. | 705/10 |
| 6,216,108 B1 | * 4/2001 | LeVander | 705/7 |

FOREIGN PATENT DOCUMENTS

GB   PCT/GB96/03102   12/1996 ........... G06F/17/30

OTHER PUBLICATIONS

"Approach for Windows User's Guide", 1992, Approach Software Corporation, 2–7 through 2–10, B–2 through B–6, 2–20.*

* cited by examiner

Primary Examiner—Greta Robinson
Assistant Examiner—Susan Rayyan
(74) Attorney, Agent, or Firm—Nixon & Vanderhye P.C.

(57) ABSTRACT

A hierarchical relational definition system (26) for defining an object is provided in which a user is presented with a plurality of menus from which selections are made, whereupon the system references a database (10) to obtain information about an object corresponding to said selections, the data including control data to determine whether a formula is to be referenced to calculate further data, and provides an output including information about said object. The system is useful in cost estimate engineering to provide estimates of man-hours to install materials. The system also has a formula adjustment mechanism (44,46) to refine the formulae according to any variation between the actual man-hours and the calculated man-hours.

19 Claims, 6 Drawing Sheets

HIERARCHICAL RELATIONAL DEFINITION SYSTEM FOR DEFINING AN OBJECT AND METHOD THEREFOR

TECHNICAL FIELD

This invention relates to a hierarchical relational definition system and a method of defining an object.

BACKGROUND ART

Literally, cost estimate engineering is the preparation of a cost estimate for an engineering project. A cost estimate typically comprises two components, direct costs and indirect costs.

Indirect costs include such things as site supervision, site engineers, plant and equipment hire, insurance and so forth. Whilst indirect costs are not negligible, in most engineering projects, direct costs constitute the bulk of the costs.

Direct costs consist of the materials used in the project and labour required to install the materials. Typically, the materials are organised as a bill of materials, which is a list of every material item required for the engineering project.

To produce a direct cost estimate, the labour required to install the materials in the bill of materials is estimated. Whilst information on materials for engineering projects exists, estimating the labour required to install a material has predominantly been based on the judgement of the cost estimate engineer. Thus, there has been a risk of inconsistencies in cost estimates, due to different judgements of cost estimate engineers in relation to the labour required for a particular material or the differing judgement of the same cost estimate engineer on a day to day basis.

Heretofore it has been unknown to have an integrated structured system with on-line databases to assist a cost estimate engineer in preparing multi-disciplined direct and indirect cost estimates at order of magnitude, budget and/or definitive level.

It is believed that such a system would have many advantages, including that it would provide a level of consistency in the labour estimates appearing in the direct cost estimates.

SUMMARY OF THE INVENTION

In accordance with one aspect of this invention, there is provided a hierarchical relational definition system for defining an object, comprising:
  interface means that sequentially presents a plurality of menus from which selections are made, each selection forming an input parameter, said input parameters corresponding to an object;
  indexing means which forms an index from at least one of the input parameters;
  database means including fields in which data relating to said object is stored, one of the fields including control data;
  referencing means arranged to reference the database means using the index to obtain therefrom the data relating to the object;
  processing means responsive to said control data, said control data including instructions to control whether the processing means references a formula and calculates further data relating to said object; and
  output means for creating an output corresponding to at least one of the input parameters and/or at least some of the data and the further data, if any, said output defining the object.

Preferably, each combination of input parameters represents a different object.

Preferably, only one selection is made from each menu.

Preferably, the index is formed from a plurality of the input parameters. In a preferred arrangement, the index is formed from the concatenated values of the plurality of input parameters.

Preferably, the hierarchical relational definition system includes a formulae database referenced by the processing means to obtain the formula.

Preferably, the hierarchical relational definition system is provided with a formulae adjustment database, in which adjustments to each formula in the formulae database are stored, said processing means also referencing said formulae adjustment database when calculating the further data.

Preferably, the hierarchical relational definition system is provided with a comparison means, responsive to the output and to actual data provided by a user corresponding to actual values of the further data, the comparison means altering the adjustment corresponding to the object in the formulae adjustment database to reduce any difference between the actual data and the further data.

In one arrangement, the processing means is also responsive to at least one of the input parameters and/or at least some of the data when calculating the further data.

In one arrangement, the database means and the formula adjustment database each comprise a table.

Preferably, the output means comprises table generation means which produces a table comprising at least one row, each row corresponding to an object and containing the input parameters and the further data.

Preferably, the control data includes information as to whether a user is to be asked to enter data relating to the object.

According to another aspect of the present invention, there is provided a method for defining an object, comprising the steps of:
  sequentially presenting a plurality of menus from which selections are made;
  forming an index from at least one of the selections;
  referencing a database using the index to obtain therefrom data relating to the object, some of said data being control data;
  determining from said control data whether to reference a formula to calculate further data relating to the object, and if so, referencing said formula and calculating said further data; and
  presenting at least one of the selections and/or at least some of the date and the further data, if any, as an output, wherein the output defines the object.

Preferably, the index is formed from a plurality of the selections.

Preferably, the method includes the step of referencing a formulae adjustment database to obtain therefrom an adjustment for said formula, which is utilised in calculating the further date.

Preferably, the method includes the step of comparing the further data with an actual value provided by a user, and on the basis of the comparison altering the adjustment corresponding to the object to reduce the difference between the further data and the actual value.

BRIEF DESCRIPTION OF THE DRAWINGS

This invention will now be described with reference to one embodiment thereof and the accompanying drawings in which.

DETAILED DESCRIPTION OF DRAWINGS

Figure 1:
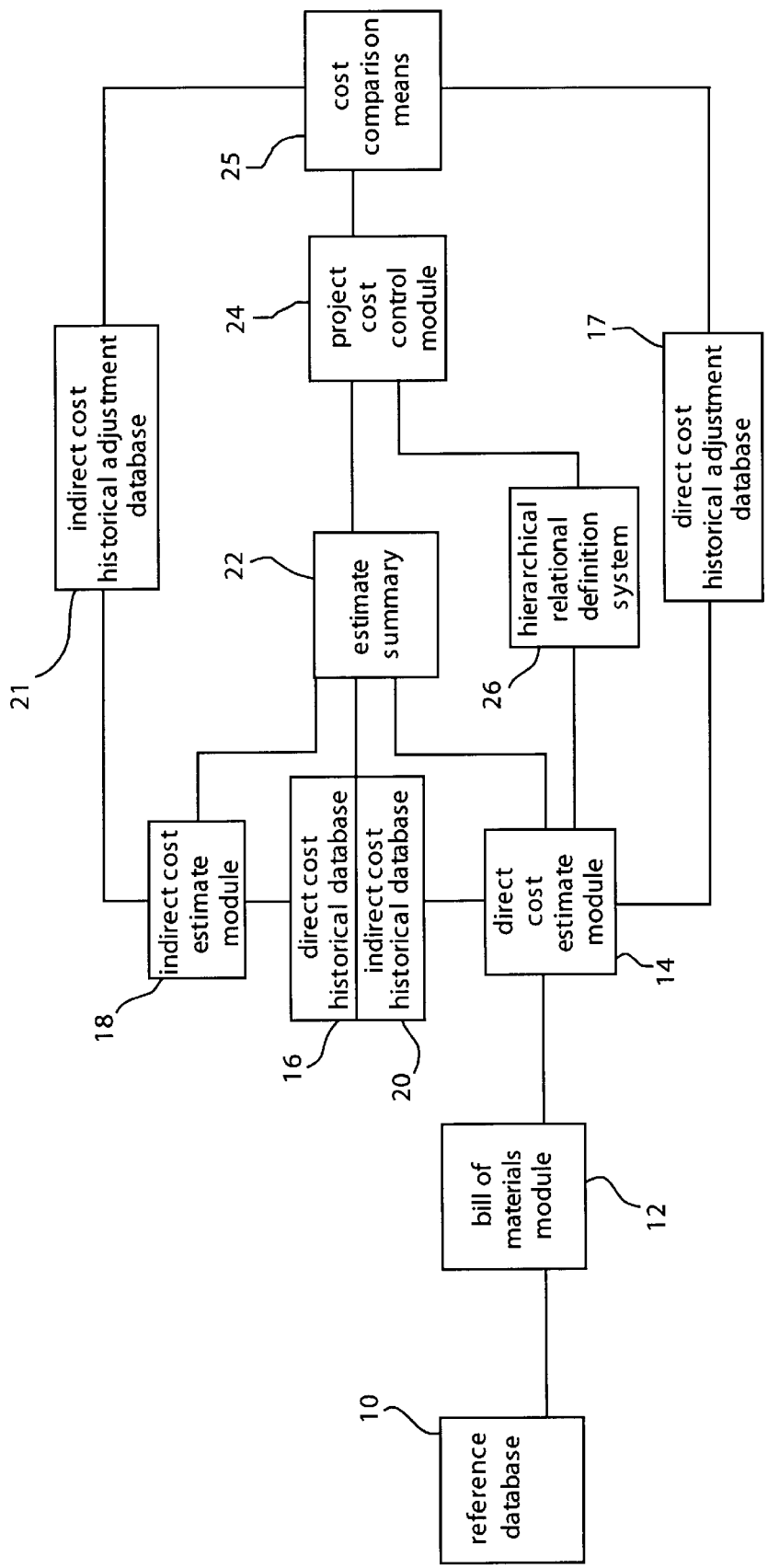
FIG. 1 is a functional block diagram of a cost estimate engineering software package of the embodiment.
Figure 2:
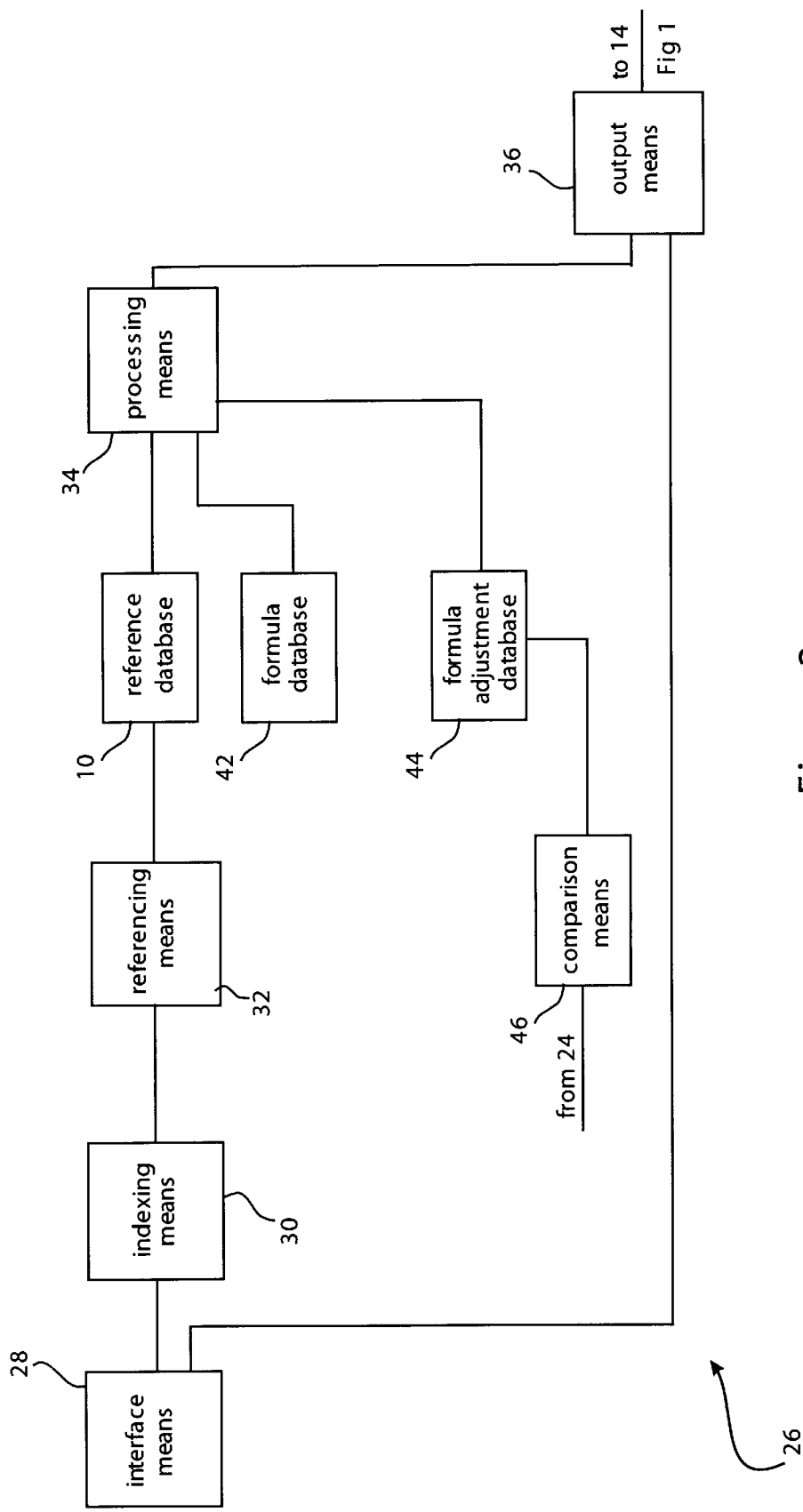
FIG. 2 is a functional block diagram of a hierarchical relational definition system incorporated in the cost estimate engineering software package of the embodiment.

Whilst the invention is applicable to other areas, the embodiment is directed toward use in cost estimate engineering and the method of providing a cost estimate using the same. The embodiment is implemented as a software package executing on a computer.

The cost estimate engineering software package of the embodiment comprises a reference database 10, a bill of materials module 12, a direct cost estimate module 14, a direct cost historical database 16, a direct cost historical adjustment database 17, an indirect cost estimate module 18, an indirect cost historical database 20, an indirect cost historical adjustment database 21, an estimate summary 22 and a project cost control module 24, and a cost comparison means 25.

The bill of materials module 12 is formed as a hierarchical relational definition system 26 comprising an interface means 28, an indexing means 30, the reference database 10, a referencing means 32, a processing means 34 and an output means 36.

The interface means 28 presents a plurality of menus from which a user can make selections according to the material the user requires.

Cost estimate engineering usually involves estimating costs for a variety of different materials from a number of engineering disciplines. To accommodate this, there is more than one plurality of menus, each plurality being for each category of materials. In addition, the number of menus in each plurality of menus varies depending upon how many selections are required to uniquely identify the material. Thus, the number of menus will vary according to whether the type of required material is a piping material, an electrical engineering material or a structural engineering material.

Each of the plurality of menus has certain characteristics in common. Each plurality of menus has one or more menus in which the user's selections are used by the indexing means 30 to form the index. The number of such menus and the information presented in those menu varies from material category to category.

In addition, each plurality of menus may have a number of menus, that are not utilised by the indexing means 30 but which are required in order to uniquely identify the material for the purposes of the bill of materials and also for ordering purposes.

Whether or not a menu is used by the indexing means 30 depends upon whether the information provided in the menu influences the further data calculated by the processing means 34. In the embodiment, the further data is man-hours required to install the material. Consequently, menus which contain information that influence the man-hours required to install the material are used by the indexing means 30, whereas menus which contain information that does not affect the man-hours required to install the material, such as material finish, are not used by the indexing means 30.

In this regard, it should be appreciated that the information in the menus used by the indexing means 30 may or may not directly appear in the formula used to calculate the man-hours, but the information is necessary to uniquely identify the material and to form the index that is used to reference the date for that material, which data maybe utilised in the formula.

In the present embodiment, the menus are presented in a tree structure, so that the options presented to the user in the second menu depend upon the selection made in the first menu, and so forth.

Figure 4A:
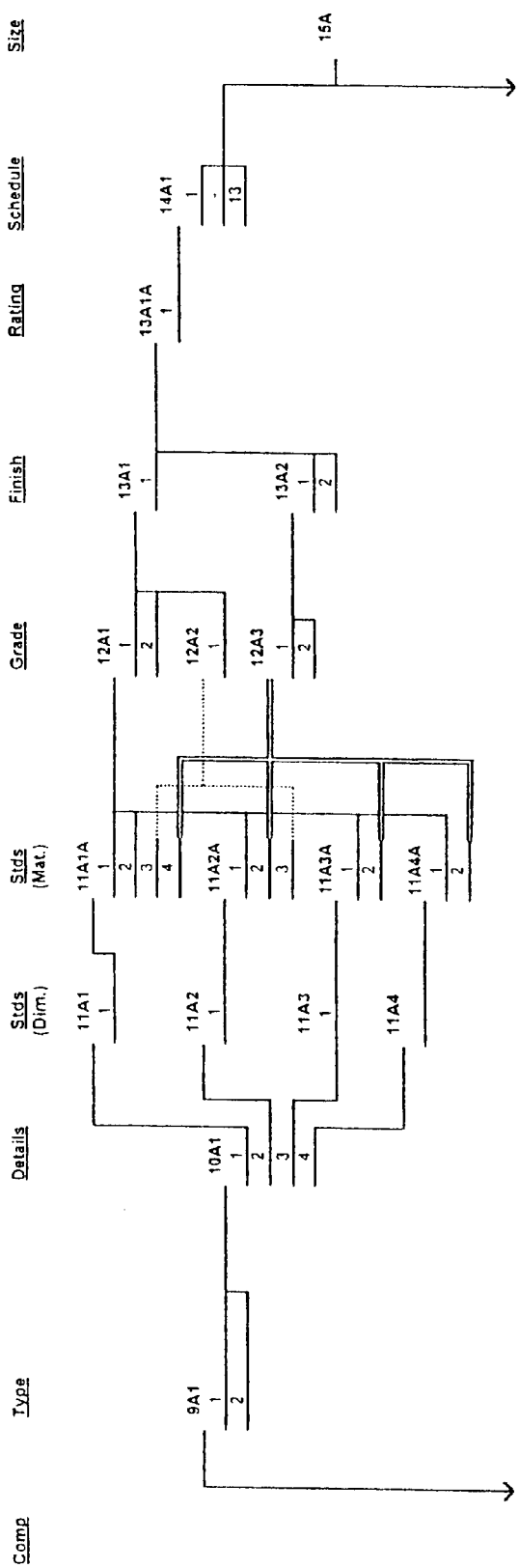
FIG. 4 shows the tree menu structure utilised in the hierarchical relational definition system of FIG. 2.
Figure 4B:
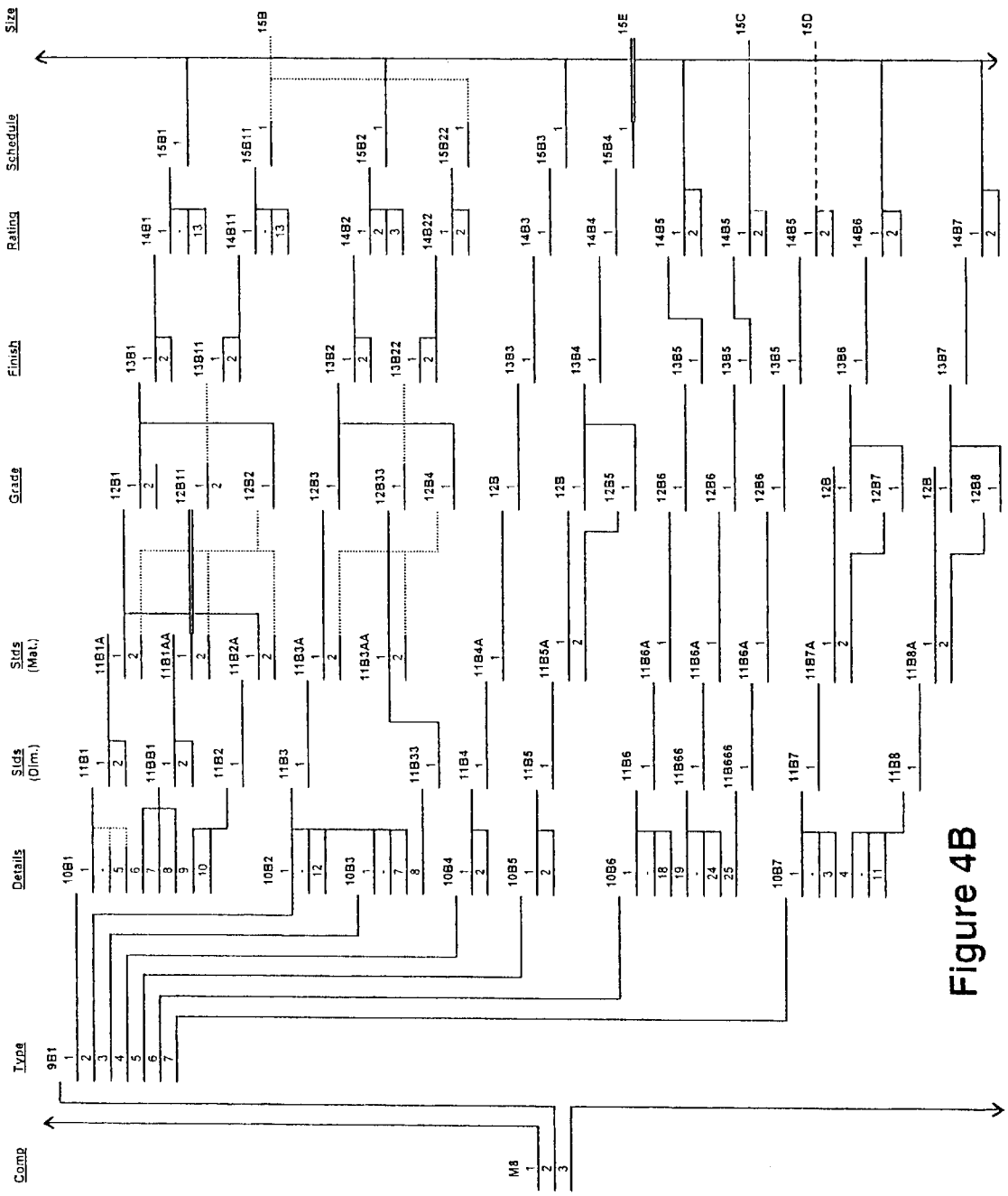
Figure 4C:
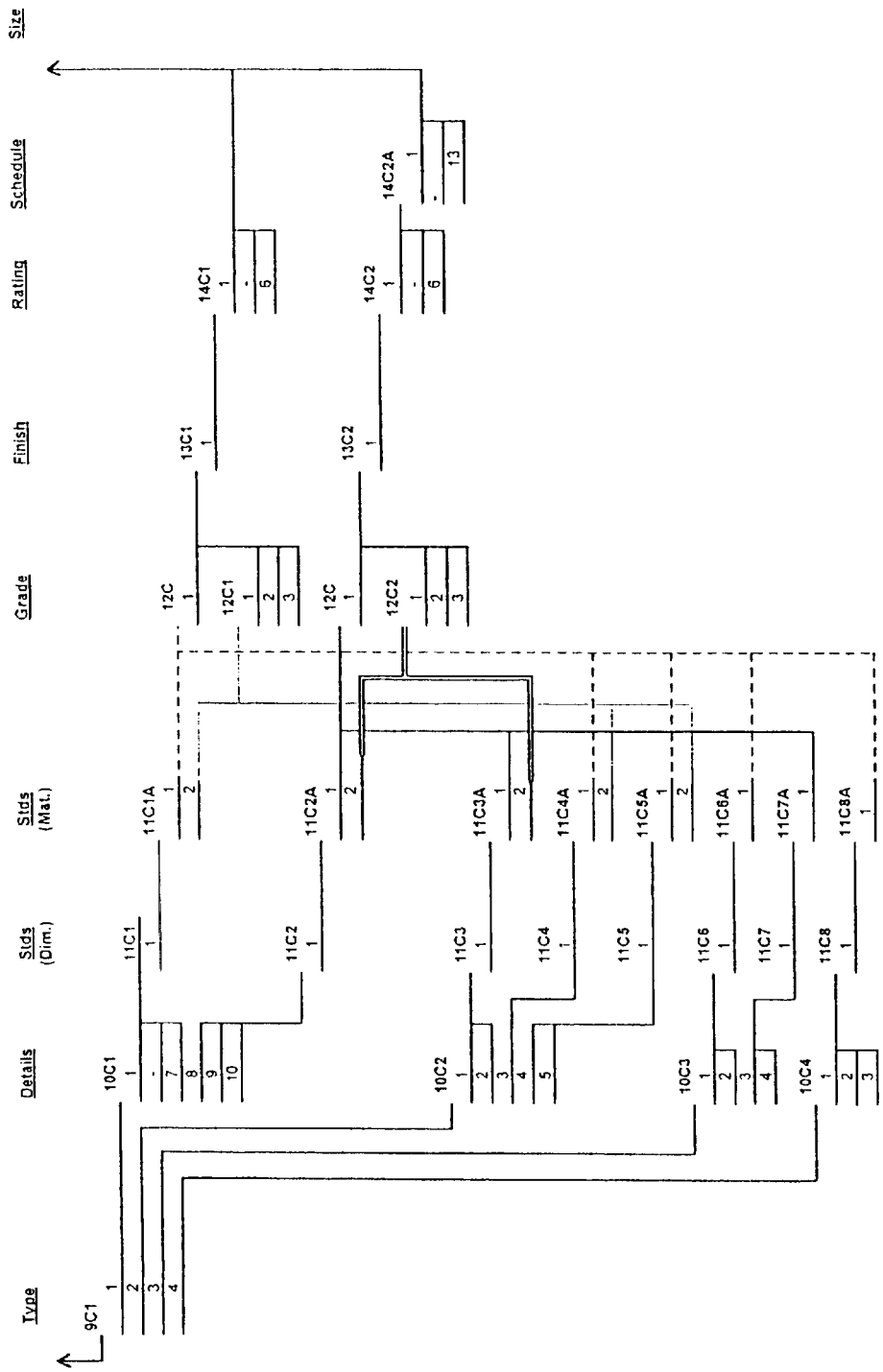

Whilst it should be appreciated that menus for various categories of materials can be provided, in the present embodiment the menus presented are in respect of carbon steel piping to American standards and are shown in FIG. 4. The diagram in FIG. 4 is a tree diagram of the menu structure. Nine menu levels are shown, entitled Comp (component), Type joining type), Details (45° elbow, t-piece, etc), STDS (the specific standard of manufacture), Grade, Finish, Rating, Schedule and Size. Of these menus, the selections made in the Comp, Details, Rating, Schedule and Size menus are used by the indexing means 30 to form the index.

Having selected carbon steel piping to American standards, a user is initially presented with the component menu M8 from which one of three options are selected. The numbers present in FIG. 4 are for illustrative purposes only, but in the actual embodiment, a user is presented with meaningful descriptions. A table of the descriptions presented to the user corresponding to each of the menu options for each menu in FIG. 4 is presented as a table below. For the sake of brevity, menus with numerous items have only some of the items shown in the table below. Where items have been omitted, elipses are shown in the table.

| | MENU SYSTEM | | | CARBON STEEL TO AMERICAN STANDARDS | | |
|---|---|---|---|---|---|---|
| Menu | | Menu No. | ITEM | DESCRIPTION | NEXT MENU | |
| M1-1 | GROUP | 1 | 1 | C S (CARBON STEEL TO AMERICAN STD.) | M2 | 2 |
| M1-2 | GROUP | 1 | 2 | A S (ALLOY STEEL TO AMERICAN STD.) | M2 | |
| M1-3 | GROUP | 1 | 3 | S S (STAINLESS STEEL TO AMERICAN STD.) | M2 | |
| M1-4 | GROUP | 1 | 4 | S T (STEEL PIPE TO AUSTRALIAN STD.) | M2 | |
| M1-5 | GROUP | 1 | 5 | D I (DUCTILE IRON PIPE) | M2 | |
| M1-6 | GROUP | 1 | 6 | C U (COPPER PIPE) | M2 | |
| M1-7 | GROUP | 1 | 7 | V P (VICTUALIC PIPE) | M2 | |
| M1-8 | GROUP | 1 | 8 | P V (PLASTIC PIPE) | M2 | |

-continued

| Menu | | Menu No. | ITEM | DESCRIPTION | NEXT MENU | |
|---|---|---|---|---|---|---|
| \multicolumn{2}{c}{MENU SYSTEM} | | | \multicolumn{2}{c}{CARBON STEEL TO AMERICAN STANDARDS} | |
| M2-1 | COMPONNT | 2 | A | PIPE | CS3A1 | 3 |
| M2-2 | COMPONNT | 2 | B | FITTINGS | CS3B1 | 28 |
| M2-3 | COMPONNT | 2 | C | FLANGES | CS3C1 | 236 |
| M2-4 | COMPONNT | 2 | D | VALVES | CS3D1 | |
| M2-5 | COMPONNT | 2 | E | BOLTS | CS3E1 | 398 |
| M2-6 | COMPONNT | 2 | F | GASKETS | CS3F1 | 527 |
| M2-7 | COMPONNT | 2 | G | SPECIALS | CS3G1 | |
| M2-8 | COMPONNT | 2 | H | SUPPORTS | CS3H1 | |
| CS3A1 | TYPE | 3 | 1 | BEVELLED ENDS | CS4A1 | 4 |
| | | 3 | 2 | PLAIN ENDS | CS4A1 | 4 |
| CS4A1 | DETAILS | 4 | 1 | SEAMLESS | CS5A1 | 5 |
| | | 4 | 2 | ELECTRIC RESISTANT WELDED | CS5A2 | 6 |
| | | 4 | 3 | DOUBLE SUBMERGED ARC WELDED | CS5A3 | 7 |
| | | 4 | 4 | BUTT WELDED | CS5A4 | 7 |
| CS5A1 | STD.(DIM.) | 5 | 1 | ANSI B36.10 | CS6A1 | 8 |
| CS5A2 | STD.(DIM.) | 6 | 1 | ANSI B36.10 | CS6A2 | 9 |
| CS5A3 | STD.(DIM.) | 7 | 1 | ANSI B36.10 | CS6A3 | 10 |
| CS6A1 | STD.(MAT.) | 8 | 1 | API 5L | CS7A1 | 11 |
| | | 8 | 2 | ASTM A105 | CS7A1 | 11 |
| | | 8 | 3 | ASTM A53 | CS7A2 | 12 |
| | | 8 | 4 | ASTM A333 (LOW TEMP.) | CS7A3 | 13 |
| CS6A2 | STD.(MAT.) | 9 | 1 | API 5L | CS7A1 | 11 |
| | | 9 | 2 | ASTM A53 | CS7A2 | 12 |
| | | 9 | 3 | ASTM A333 | CS7A3 | 13 |
| CS6A3 | STD.(MAT.) | 10 | 1 | API 5L | CS7A1 | 11 |
| | | 10 | 2 | ASTM A53 | CS7A2 | 12 |
| CS7A1 | GRADES | 11 | 1 | GRADE A | CS8A1 | 14 |
| | | 11 | 2 | GRADE B | CS8A1 | 14 |
| CS7A2 | GRADES | 12 | 1 | GRADE A | CS8A2 | 15 |
| | | 12 | 2 | GRADE B | CS8A2 | 15 |
| CS7A3 | GRADES | 13 | 1 | GRADE 6 | CS8A1 | 14 |
| CS8A1 | FINISH | 14 | 1 | BLACK | CS9AN1 | 16 |
| CS8A2 | FINISH | 15 | 1 | BLACK | CS9AN1 | 16 |
| | | 15 | 2 | GALVANISED | CS9AN1 | 16 |
| CS9AN1 | | 16 | 1 | NOT APPLICABLE | CS10A1 | 17 |
| CS10A1 | SCHEDULE | 17 | 1 | STANDARD WEIGHT | CS11A | 18 |
| | | 17 | 2 | EXTRA STRONG | CS11A | 18 |
| | | 17 | 3 | DOUBLE EXTRA STRONG | CS11B | 19 |
| | | 17 | 4 | SCHEDULE 10 | CS11C | 20 |
| | | 17 | 5 | SCHEDULE 20 | CS11D | 21 |
| | | 17 | 6 | SCHEDULE 30 | CS11E | 22 |
| | | 17 | 7 | SCHEDULE 40 | CS11F | 23 |
| | | 17 | 8 | SCHEDULE 60 | CS11G | 24 |
| | | 17 | 9 | SCHEDULE 80 | CS11H | 25 |
| | | 17 | 10 | SCHEDULE 100 | CS11G | 24 |
| | | 17 | 11 | SCHEDULE 120 | CS11I | 26 |
| | | 17 | 12 | SCHEDULE 140 | CS11G | 24 |
| | | 17 | 13 | SCHEDULE 160. | CS11J | 27 |
| CS11A | SIZES | 18 | 1 | 6 | | |
| | | 18 | 2 | 8 | | |
| | | 18 | 3 | 10 | | |
| | | 18 | 4 | 15 | | |
| . . . | . . . | . . . | . . . | . . . | . . . | . . . |
| | | 18 | 30 | 900 | | |
| | | 18 | 31 | 1050 | | |
| CS11J | SIZES | 27 | 1 | 15 | | |
| | | 27 | 2 | 20 | | |
| | | 27 | 3 | 25 | | |
| | | 27 | 4 | 32 | | |
| . . . | . . . | . . . | . . . | . . . | . . . | . . . |
| | | 27 | 19 | 550 | | |
| | | 27 | 20 | 600 | | |
| CS3B1 | TYPE | 28 | 1 | BUTT WELDED | CS4B1 | 29 |
| | | 28 | 2 | HIGH PRESSURE SCREWED | CS4B2 | 30 |
| | | 28 | 3 | HIGH PRESSURE SOCKET WELD | CS4B3 | 31 |
| | | 28 | 4 | HIGH PRESSURE UNIONS | CS4B4 | 32 |
| | | 28 | 5 | HIGH PRESSURE REDUCER INSERTS | CS4B5 | 33 |
| | | 28 | 6 | HIGH PRESSURE TUBULARS | CS4B6 | 34 |
| | | 28 | 7 | OUTLET FITTINGS | CS4B7 | 35 |
| CS4B1 | DETAILS | 29 | 1 | ELBOWS 90 DEGREE LONG RADIUS | CS5B1 | 36 |
| | | 29 | 2 | ELBOWS 45 DEGREE LONG RADIUS | CS5B1 | 36 |
| | | 29 | 3 | TEES EQUEL | CS5B1 | 36 |
| | | 29 | 4 | RETURNS 180 DEGREE LONG RADIUS | CS5B1 | 36 |
| | | 29 | 5 | CAPS | CS5B2 | 37 |

-continued

| Menu | Menu No. | ITEM | DESCRIPTION | NEXT MENU | |
|---|---|---|---|---|---|
| | | | MENU SYSTEM / CARBON STEEL TO AMERICAN STANDARDS | | |
| | 29 | 6 | TEES REDUCING | CS5B3 | 38 |
| | 29 | 7 | REDUCERS CONCENTRIC | CS5B3 | 38 |
| | 29 | 8 | REDUCERS ECCENTRIC | CS5B3 | 38 |
| | 29 | 9 | ELBOWS 90 DEGREE SHORT RADIUS | CS5B4 | 39 |
| | 29 | 10 | RETURNS 180 DEGREE SHORT RADIUS | CS5B4 | 39 |
| CS4B2 | DETAILS 30 | 1 | ELBOWS 90 DEGREE | CS5B5 | 40 |
| | 30 | 2 | ELBOWS 45 DEGREE | CS5B5 | 40 |
| | 30 | 3 | TEES EQUEL | CS5B5 | 40 |
| ... | ... ... | ... | ... | ... | ... |
| | 30 | 12 | TEES REDUCING | CS5B8 | 43 |
| CS4B3 | DETAILS 31 | 1 | ELBOWS 90 DEGREE | CS5B9 | 44 |
| | 31 | 2 | ELBOWS 45 DEGREE | CS5B9 | 44 |
| | 31 | 3 | TEES EQUEL | CS5B9 | 44 |
| | 31 | 4 | CROSSES | CS5B9 | 44 |
| | 31 | 5 | COUPLINGS FULL | CS5B9 | 44 |
| | 31 | 6 | COUPLINGS HALF | CS5B9 | 44 |
| | 31 | 7 | CAPS | CS5B9 | 44 |
| | 31 | 8 | TEES REDUCING | CS5B10 | 45 |
| CS4B4 | DETAILS 32 | 1 | UNIONS SCREWS | CS5B11 | 46 |
| | 32 | 2 | UNIONS SOCKET WELD | CS5B11 | 46 |
| CS4B5 | DETAILS 33 | 1 | REDUCER INSERTS TYPE 1 | CS5B12 | 47 |
| | 33 | 2 | REDUCER INSERTS TYPE 2 | CS5B12 | 47 |
| CS4B6 | DETAILS 34 | 1 | SWAGE NIPPLES CONCENTRIC LESC/SESC | CS5B13 | 48 |
| | 34 | 1 | SWAGE NIPPLES CONCENTRIC LESC/SEPE | CS5B13 | 48 |
| | 34 | 1 | SWAGE NIPPLES CONCENTRIC LESC/SEBE | CS5B13 | 48 |
| | 34 | 1 | SWAGE NIPPLES CONCENTRIC LEPE/SESC | CS5B13 | 48 |
| ... | ... ... | ... | ... | ... | ... |
| | 34 | 23 | PIPE NIPPLES PE/BE | CS5B14 | 49 |
| | 34 | 24 | PIPE NIPPLES BE/BE | CS5B14 | 49 |
| CS4B7 | DETAILS 35 | 1 | WELDOLETS | CS5B15 | 50 |
| | 35 | 2 | LATROLETS BUTT WELD | CS5B16 | 51 |
| | 35 | 3 | ELBOLETS BUTT WELDS | CS5B16 | 51 |
| ... | ... ... | ... | ... | ... | ... |
| | 35 | 11 | NIPOLETS PLAIN END | CS5B20 | 55 |
| CS5B1 | STD.(DIAM.) 36 | 1 | ANSI B16.9 (TO 600 DIA.) | CS6B1 | 56 |
| | 36 | 2 | MSS-SP48 (ABOVE 600 DIA.) | CS6B2 | 57 |
| CS5B2 | STD.(DIAM.) 37 | 1 | ANSI B16.9 (TO 600 DIA.) | CS6B3 | 58 |
| | 37 | 2 | MSS-SP48 (ABOVE 600 DIA.) | CS6B4 | 59 |
| CS5B3 | STD.(DIAM.) 38 | 1 | ANSI B16.9 (TO 600 DIA.) | CS6B5 | 60 |
| | 38 | 2 | MSS-SP48 (ABOVE 600 DIA.) | CS6B6 | 61 |
| CS5B4 | STD.(DIAM.) 39 | 1 | ANSI B16.28 | CS6B7 | 62 |
| ... | ... ... | ... | ... | ... | ... |
| CS5B19 | STD.(DIAM.) 54 | 1 | ANSI B16.11 | CS6B22 | 77 |
| CS5B20 | STD.(DIAM.) 55 | 1 | ANSI B16.11 | CS6B23 | 78 |
| CS6B1 | STD.(MAT.) 56 | 1 | ASTM A234 | CS7B1 | 79 |
| | 56 | 2 | ASTM A420 (LOW TEMP.) | CS7B2 | 80 |
| CS6B2 | STD.(MAT.) 57 | 1 | ASTM A234 | CS7B3 | 81 |
| | 57 | 2 | ASTM A420 (LOW TEMP.) | CS7B4 | 82 |
| CS6B3 | STD.(MAT.) 58 | 1 | ASTM A234 | CS7B5 | 83 |
| | 58 | 2 | ASTM A420 (LOW TEMP.) | CS7B6 | 84 |
| ... | ... ... | ... | ... | ... | ... |
| CS6B23 | STD.(MAT.) 78 | 1 | ASTM A105 | CS7BN8 | 120 |
| | 78 | 2 | ASTM A350 (LOW TEMP.) | CS7B35 | 121 |
| CS7B1 | GRADES 79 | 1 | WPA | CS8B1 | 122 |
| | 79 | 2 | WPB | CS8B1 | 122 |
| CS7B2 | GRADES 80 | 1 | WPL6 | CS8B1 | 122 |
| ... | ... ... | ... | ... | ... | ... |
| CS7B35 | GRADES 121 | 1 | LF3 | CS8B23 | 144 |
| CS8B1 | FINISH 122 | 1 | BLACK | CS9BN1 | 145 |
| CS8B2 | FINISH 123 | 1 | BLACK | CS9BN2 | 146 |
| ... | ... ... | ... | ... | ... | ... |
| CS8B8 | FINISH 129 | 1 | BLACK | CS9B1 | 152 |
| | 129 | 2 | GALVANISED | CS9B1 | 152 |
| ... | ... ... | ... | ... | ... | ... |
| CS8B23 | FINISH 144 | 1 | BLACK | CS9B12 | 167 |
| CS9BN1 | 145 | 1 | NOT APPLICABLE | CS10B1 | 168 |
| CS9BN2 | 146 | 1 | NOT APPLICABLE | CS10B2 | 169 |
| CS9BN3 | 147 | 1 | NOT APPLICABLE | CS10B3 | 170 |
| CS9BN4 | 148 | 1 | NOT APPLICABLE | CS10B4 | 171 |
| CS9BN5 | 149 | 1 | NOT APPLICABLE | CS10B5 | 172 |
| CS9BN6 | 150 | 1 | NOT APPLICABLE | CS10B6 | 173 |
| CS9BN7 | 151 | 1 | NOT APPLICABLE | CS10B7 | 174 |
| CS9B1 | RATING 152 | 1 | 2000# | CS10BN1 | 175 |
| | 152 | 2 | 3000# | CS10BN1 | 175 |

-continued

| Menu | Menu No. | ITEM | DESCRIPTION | NEXT MENU | |
|---|---|---|---|---|---|
| | | 152 | 3 | 6000# | CS10BN1 | 175 |
| ... | ... | ... | ... | ... | ... | ... |
| CS9B12 | RATING | 167 | 1 | 3000# | CS10BN17 | 195 |
| | | 167 | 2 | 6000# | CS10BN17 | 195 |
| CS10B1 | SCHEDULE | 168 | 1 | STANDARD WEIGHT | CS11K | 196 |
| | | 168 | 2 | EXTRA STRONG | CS11K | 196 |
| | | 168 | 3 | DOUBLE EXTRA STRONG | CS11L | 197 |
| | | 168 | 4 | SCHEDULE 10 | CS11M | 198 |
| ... | ... | ... | ... | ... | ... | ... |
| | | 168 | 13 | SCHEDULE 160 | CS11Q | 201 |
| CS10B2 | SCHEDULE | 169 | 1 | STANDARD WEIGHT | CS11R | 202 |
| | | 169 | 2 | EXTRA STRONG | CS11R | 202 |
| | | 169 | 3 | SCHEDULE 10 | CS11R | 202 |
| | | 169 | 4 | SCHEDULE 20 | CS11R | 202 |
| | | 169 | 5 | SCHEDULE 30 | CS11R | 202 |
| | | 169 | 6 | SCHEDULE 40 | CS11S | 203 |
| CS10B3 | SCHEDULE | 170 | 1 | STANDARD WEIGHT | CS11K | 196 |
| | | 170 | 2 | EXTRA STRONG | CS11K | 196 |
| CS10B4 | SCHEDULE | 171 | 1 | STANDARD WEIGHT | CS11R | 202 |
| | | 171 | 2 | EXTRA STRONG | CS11R | 202 |
| CS10B5 | SCHEDULE | 172 | 1 | STANDARD WEIGHT | CS11U | 204 |
| | | 172 | 2 | EXTRA STRONG | CS11U | 204 |
| | | 172 | 3 | DOUBLE EXTRA STRONG | CS11V | 205 |
| ... | ... | ... | ... | ... | ... | ... |
| | | 172 | 13 | SCHEDULE 160 | CS11Z | 209 |
| CS10B6 | SCHEDULE | 173 | 1 | STANDARD WEIGHT | CS11AA | 210 |
| | | 173 | 2 | EXTRA STRONG | CS11AA | 210 |
| | | 173 | 3 | SCHEDULE 10 | CS11AA | 210 |
| | | 173 | 4 | SCHEDULE 20 | CS11AA | 210 |
| | | 173 | 5 | SCHEDULE 30 | CS11AA | 210 |
| | | 173 | 6 | SCHEDULE 40 | CS11AB | 211 |
| CS10B7 | SCHEDULE | 174 | 1 | STANDARD WEIGHT | CS11AC | 212 |
| | | 174 | 2 | EXTRA STRONG | CS11AC | 212 |
| | | 174 | 3 | DOUBLE EXTRA STRONG | CS11AD | 213 |
| ... | ... | ... | ... | ... | ... | ... |
| | | 174 | 13 | SCHEDULE 160 | CS11AH | 217 |
| CS10BN1 | | 175 | 1 | NOT APPLICABLE | CS11AI | 218 |
| CS10BN2 | | 176 | 1 | NOT APPLICABLE | CS11AI | 219 |
| ... | ... | ... | ... | ... | ... | ... |
| CS10BN10 | | 184 | 1 | NOT APPLICABLE | CS11AP | 225 |
| CS10BN11 | | 185 | 1 | NOT APPLICABLE | CS11AQ | 226 |
| CS10B8 | SCHEDULE | 186 | 1 | SCHEDULE 80 | CS11AM | 222 |
| | | 186 | 2 | SCHEDULE 160 | CS11AM | 222 |
| CS10B9 | SCHEDULE | 187 | 1 | SCHEDULE 80 | CS11AR | 227 |
| | | 187 | 2 | SCHEDULE 160 | CS11AS | 228 |
| CS10B10 | SCHEDULE | 188 | 1 | STANDARD WEIGHT | CS11AT | 229 |
| | | 188 | 2 | EXTRA STRONG | CS11AU | 230 |
| CA10B11 | SCHEDULE | 189 | 1 | STANDARD WEIGHT | CS11AV | 231 |
| | | 189 | 2 | EXTRA STRONG | CS11AV | 231 |
| CS10BN12 | | 190 | 1 | NOT APPLICABLE | CS11AW | 232 |
| CS10BN13 | | 191 | 1 | NOT APPLICABLE | CS11AX | 233 |
| CS10BN14 | | 192 | 1 | NOT APPLICABLE | CS11AW | 232 |
| CS10BN15 | | 193 | 1 | NOT APPLICABLE | CS11AY | 234 |
| CS10BN16 | | 194 | 1 | NOT APPLICABLE | CS11AV | 231 |
| CS10BN17 | | 195 | 1 | NOT APPLICABLE | CS11AZ | 235 |
| CS11K | SIZES | 196 | 1 | 15 | | |
| | | 196 | 2 | 20 | | |
| | | 196 | 3 | 25 | | |
| ... | ... | ... | ... | ... | ... | ... |
| | | 196 | 20 | 600 | | |
| CS11L | SIZES | 197 | 1 | 15 | | |
| | | 197 | 2 | 20 | | |
| | | 197 | 3 | 25 | | |
| ... | ... | ... | ... | ... | ... | ... |
| | | 197 | 15 | 300 | | |
| CS11M | SIZES | 198 | 1 | 350 | | |
| | | 198 | 2 | 400 | | |
| | | 198 | 3 | 450 | | |
| | | 198 | 4 | 500 | | |
| | | 198 | 5 | 600 | | |
| CS11N | SIZES | 199 | 1 | 200 | | |
| | | 199 | 2 | 250 | | |
| | | 199 | 3 | 300 | | |
| ... | ... | ... | ... | ... | ... | ... |

-continued

| Menu | Menu System | Menu No. | ITEM | DESCRIPTION | NEXT MENU | |
|---|---|---|---|---|---|---|
| | | | | CARBON STEEL TO AMERICAN STANDARDS | | |
| | | 199 | 8 | 600 | | |
| CS11P | SIZES | 200 | 1 | 100 | | |
| | | 200 | 2 | 125 | | |
| | | 200 | 3 | 150 | | |
| . . . | . . . | . . . | . . . | . . . | . . . | . . . |
| | | 200 | 11 | 600 | | |
| CS11Q | SIZES | 201 | 1 | 15 | | |
| | | 201 | 2 | 20 | | |
| | | 201 | 3 | 25 | | |
| . . . | . . . | . . . | . . . | . . . | . . . | . . . |
| | | 201 | 19 | 600 | | |
| CS11R | SIZES | 202 | 1 | 750 | | |
| | | 202 | 2 | 900 | | |
| CS11S | SIZES | 203 | 1 | 900 | | |
| CS11U | SIZES | 204 | 1 | 20 × 15 | | |
| | | 204 | 2 | 25 × 20 | | |
| | | 204 | 3 | 25 × 15 | | |
| . . . | . . . | . . . | . . . | . . . | . . . | . . . |
| | | 204 | 80 | 600 × 250 | | |
| CS11V | SIZES | 205 | 1 | 20 × 15 | | |
| | | 205 | 2 | 25 × 20 | | |
| | | 205 | 3 | 25 × 15 | | |
| . . . | . . . | . . . | . . . | . . . | . . . | . . . |
| | | 205 | 49 | 300 × 250 | | |
| CS11W | SIZES | 206 | 1 | 400 × 350 | | |
| | | 206 | 2 | 450 × 400 | | |
| | | 206 | 3 | 450 × 350 | | |
| . . . | . . . | . . . | . . . | . . . | . . . | . . . |
| | | 206 | 10 | 600 × 350 | | |
| CS11X | SIZES | 207 | 1 | 250 × 200 | | |
| | | 207 | 2 | 300 × 250 | | |
| | | 207 | 3 | 300 × 200 | | |
| . . . | . . . | . . . | . . . | . . . | . . . | . . . |
| | | 207 | 26 | 600 × 300 | | |
| | | 207 | 27 | 600 × 250 | | |
| CS11Y | SIZES | 208 | 1 | 125 × 100 | | |
| | | 208 | 2 | 150 × 125 | | |
| | | 208 | 3 | 150 × 100 | | |
| . . . | . . . | . . . | . . . | . . . | . . . | . . . |
| | | 208 | 40 | 600 × 250 | | |
| CS11Z | SIZES | 209 | 1 | 20 × 15 | | |
| | | 209 | 2 | 25 × 20 | | |
| | | 209 | 3 | 25 × 15 | | |
| . . . | . . . | . . . | . . . | . . . | . . . | . . . |
| | | 209 | 72 | 600 × 250 | | |
| CS11AA | SIZES | 210 | 1 | 750 × 600 | | |
| | | 210 | 2 | 750 × 500 | | |
| | | 210 | 3 | 750 × 450 | | |
| . . . | . . . | . . . | . . . | . . . | . . . | . . . |
| | | 210 | 8 | 900 × 450 | | |
| CS11AB | SIZES | 211 | 1 | 900 × 600 | | |
| | | 211 | 2 | 900 × 500 | | |
| | | 211 | 3 | 900 × 450 | | |
| . . . | . . . | . . . | . . . | . . . | . . . | . . . |
| CS11AZ | SIZES | 235 | 1 | 15 | | |
| | | 235 | 2 | | 20 | |
| | | 235 | 3 | | 25 | |
| | | 235 | 4 | | 32 | |
| | | 235 | 5 | | 40 | |
| | | 235 | 6 | | 50 | |
| CS3C1 | TYPE | 236 | 1 | STANDARD | CS4C1 | 237 |
| | | 236 | 2 | LARGE BORE | CS4C2 | 238 |
| | | 236 | 3 | ORIFICE | CS4C3 | 239 |
| | | 236 | 4 | BLINDS | CS4C4 | 240 |
| CS4C1 | DETAILS | 237 | 1 | SLIP ON | CS5C1 | 241 |
| | | 237 | 2 | SCREWED | CS5C1 | 241 |
| | | 237 | 3 | LAPPED | CS5C1 | 241 |
| . . . | . . . | . . . | . . . | . . . | . . . | . . . |
| | | 237 | 10 | SOCKET WELD | CS5C7 | 247 |
| CS4C2 | DETAILS | 238 | 1 | BLIND | CS5C8 | 248 |
| | | 238 | 2 | BLIND RING JOINT | CS5C9 | 249 |
| | | 238 | 3 | SLIP ON | CS5C10 | 250 |
| | | 238 | 4 | WELD NECK | CS5C11 | 251 |
| | | 238 | 5 | WELD NECK RING JOINT | CS5C12 | 252 |

-continued

| Menu | MENU SYSTEM | Menu No. | ITEM | CARBON STEEL TO AMERICAN STANDARDS DESCRIPTION | NEXT MENU | |
|---|---|---|---|---|---|---|
| CS4C3 | DETAILS | 239 | 1 | SLIP ON | CS5C13 | 253 |
| | | 239 | 2 | SLIP ON RING JOINT | CS5C13 | 253 |
| | | 239 | 3 | WELD NECK | CS5C14 | 254 |
| | | 239 | 4 | WELD NECK RING JOINT | CS5C14 | 254 |
| CS4C4 | DETAILS | 240 | 1 | SPECTACLE BLIND | CS5C15 | 255 |
| | | 240 | 2 | PADDLE BLIND | CS5C16 | 256 |
| | | 240 | 3 | RING SPACER | CS5C16 | 256 |
| CS5C1 | STD.(DIM.) | 241 | 1 | ANSI B16.5 | CS6C1 | 257 |
| CS5C2 | STD.(DIM.) | 242 | 1 | ANSI B16.5 | CS6C2 | 258 |
| CS5C3 | STD.(DIM.) | 243 | 1 | ANSI B16.5 | CS6C3 | 259 |
| . . . | . . . | . . . | . . . | . . . | . . . | . . . |
| CS5C16 | STD.(DIM.) | 256 | 1 | ANSI B16.5 | CS618 | 274 |
| CS6C1 | STD.(MAT.) | 257 | 1 | ASTM A105 | CS7CN1 | 275 |
| | | 257 | 2 | ASTM A360(LT) | CS7C1 | 276 |
| CS6C2 | STD.(MAT.) | 258 | 1 | ASTM A105 | CS7CN2 | 277 |
| | | 258 | 2 | ASTM A350(LT) | CS7C2 | 278 |
| . . . | . . . | . . . | . . . | . . . | . . . | . . . |
| CS6C18 | STD.(MAT.) | 274 | 1 | ASTM A105 | CS7CN18 | 308 |
| CS7CN1 | | 275 | 1 | NOT APPLICABLE | CS8C1 | 309 |
| CS7C1 | GRADES | 276 | 1 | LF1 | CS8C1 | 309 |
| | | 276 | 2 | LF2 | CS8C1 | 309 |
| | | 276 | 3 | LF2 | CS8C1 | 309 |
| . . . | . . . | . . . | . . . | . . . | . . . | . . . |
| CS7CN18 | | 308 | 1 | NOT APPLICABLE | CS8C18 | 326 |
| CS8C1 | FINISH | 309 | 1 | BLACK | CS9C1 | 327 |
| CS8C2 | FINISH | 310 | 1 | BLACK | CS9C2 | 328 |
| CS8C3 | FINISH | 311 | 1 | BLACK | CS9C3 | 329 |
| . . . | . . . | . . . | . . . | . . . | . . . | . . . |
| CS8C18 | FINISH | 326 | 1 | BLACK | CS9C18 | 344 |
| CS9C1 | RATING | 327 | 1 | CLASS 150 | CS10CN1 | 345 |
| | | 327 | 2 | CLASS 300 | CS10CN1 | 345 |
| | | 327 | 3 | CLASS 600 | CS10CN1 | 345 |
| . . . | . . . | . . . | . . . | . . . | . . . | . . . |
| CS9C18 | RATING | 344 | 1 | CLASS 150 | CS10CN21 | 374 |
| | | 344 | 2 | CLASS 300 | CS10CN21 | 374 |
| | | 344 | 3 | CLASS 600 | CS10CN21 | 374 |
| | | 344 | 4 | CLASS 900 | CS10CN21 | 374 |
| CS10CN1 | | 345 | 1 | NOT APPLICABLE | CS11K | 196 |
| CS10CN2 | | 346 | 1 | NOT APPLICABLE | CS11Q | 201 |
| CS10CN3 | | 347 | 1 | NOT APPLICABLE | CS11BA | 375 |
| . . . | . . . | . . . | . . . | . . . | . . . | . . . |
| CS10CN14 | | 358 | 1 | NOT APPLICABLE | CS11BA | 375 |
| CS10C1 | SCHEDULE | 359 | 1 | STANDARD WEIGHT | CS11K | 196 |
| | | 359 | 2 | EXTRA STRONG | CS11K | 196 |
| | | 359 | 3 | DOUBLE EXTRA STRONG | CS11L | 197 |
| | | 359 | 4 | SCHEDULE 10 | CS11M | 198 |
| . . . | . . . | . . . | . . . | . . . | . . . | . . . |
| | | 359 | 13 | SCHEDULE 160 | CS11Q | 201 |
| CS10C2 | SCHEDULE | 360 | 1 | STANDARD WEIGHT | CS11BC | 377 |
| | | 360 | 2 | EXTRA STRONG | CS11BC | 377 |
| | | 360 | 3 | DOUBLE EXTRA STRONG | CS11BD | 378 |
| | | 360 | 4 | SCHEDULE 10 | CS11BC | 198 |
| . . . | . . . | . . . | . . . | . . . | . . . | . . . |
| | | 360 | 13 | SCHEDULE 160 | CS11BC | 377 |
| CS10C3 | SCHEDULE | 361 | 1 | STANDARD WEIGHT | CS11BA | 375 |
| | | 361 | 2 | EXTRA STRONG | CS11BA | 375 |
| | | 361 | 3 | DOUBLE EXTRA STRONG | CS11BA | 375 |
| | | 361 | 4 | SCHEDULE 10 | CS11M | 198 |
| . . . | . . . | . . . | . . . | . . . | . . . | . . . |
| | | 361 | 13 | SCHEDULE 160 | CS11BA | 375 |
| CS10C4 | SCHEDULE | 362 | 1 | STANDARD WEIGHT | CS11BG | 381 |
| | | 362 | 2 | EXTRA STRONG | CS11BG | 381 |
| | | 362 | 3 | DOUBLE EXTRA STRONG | CS11BH | 382 |
| | | 362 | 4 | SCHEDULE 10 | CS11M | 198 |
| . . . | . . . | . . . | . . . | . . . | . . . | . . . |
| | | 362 | 13 | SCHEDULE 160 | CS11BI | 383 |
| CS10C5 | SCHEDULE | 363 | 1 | STANDARD WEIGHT | CS11BJ | 384 |
| | | 363 | 2 | EXTRA STRONG | CS11BJ | 384 |
| | | 363 | 3 | DOUBLE EXTRA STRONG | CS11BJ | 384 |
| | | 363 | 4 | SCHEDULE 40 | CS11BJ | 384 |
| | | 363 | 5 | SCHEDULE 80 | CS11BJ | 384 |
| | | 363 | 6 | SCHEDULE 160 | CS11BJ | 384 |
| CS10C6 | SCHEDULE | 364 | 1 | STANDARD WEIGHT | CS11BK | 385 |
| | | 364 | 2 | EXTRA STRONG | CS11BK | 385 |

-continued

| Menu | MENU SYSTEM | Menu No. | ITEM | DESCRIPTION | NEXT MENU | |
|---|---|---|---|---|---|---|
| | | 364 | 3 | DOUBLE EXTRA STRONG | CS11BK | 385 |
| | | 364 | 4 | SCHEDULE 40 | CS11BK | 385 |
| | | 364 | 5 | SCHEDULE 80 | CS11BK | 385 |
| | | 364 | 6 | SCHEDULE 160 | CS11BK | 385 |
| CS10C7 | SCHEDULE | 365 | 1 | STANDARD WEIGHT | CS11BL | 386 |
| | | 365 | 2 | EXTRA STRONG | CS11BL | 386 |
| | | 365 | 3 | DOUBLE EXTRA STRONG | CS11BL | 386 |
| | | 365 | 4 | SCHEDULE 40 | CS11BL | 386 |
| | | 365 | 5 | SCHEDULE 80 | CS11BL | 386 |
| | | 365 | 6 | SCHEDULE 160 | CS11BL | 386 |
| CS10CN15 | | 366 | 1 | NOT APPLICABLE | CS11BM | 387 |
| CS10CN16 | | 367 | 1 | NOT APPLICABLE | CS11BM | 387 |
| CS10CN17 | | 368 | 1 | NOT APPLICABLE | CS11BM | 387 |
| CS10C8 | SCHEDULE | 369 | 1 | STANDARD WEIGHT | CS11BM | 387 |
| | | 369 | 2 | EXTRA STRONG | CS11BM | 387 |
| | | 369 | 3 | SCHEDULE 20 | CS11BM | 387 |
| | | 369 | 4 | SCHEDULE 30 | CS11BN | 388 |
| | | 369 | 5 | SCHEDULE 40 | CS11BO | 389 |
| CS10CN18 | | 370 | 1 | NOT APPLICABLE | CS11BP | 390 |
| CS10C9 | SCHEDULE | 371 | 1 | STANDARD WEIGHT | CS11BP | 390 |
| | | 371 | 2 | EXTRA STRONG | CS11BP | 390 |
| | | 371 | 3 | DOUBLE EXTRA STRONG | CS11BQ | 391 |
| | | 371 | 4 | SCHEDULE 10 | CS11M | 198 |
| . . . | . . . | . . . | . . . | . . . | . . . | . . . |
| | | 371 | 13 | SCHEDULE 160 | CS11BP | 390 |
| CS10CN19 | | 372 | 1 | NOT APPLICABLE | CS11BR | 392 |
| CS10CN20 | | 373 | 1 | NOT APPLICABLE | CS11BS | 393 |
| CS10CN21 | | 374 | 1 | NOT APPLICABLE | CS11BT | 394 |
| CS11BA | SIZES | 375 | 1 | 15 | | |
| | | 375 | 2 | 20 | | |
| | | 375 | 3 | 25 | | |
| . . . | . . . | . . . | . . . | . . . | . . . | . . . |
| | | 375 | 14 | 300 | | |
| CS11BB | SIZES | 376 | 1 | 25 | | |
| | | 376 | 2 | 32 | | |
| | | 376 | 3 | 40 | | |
| . . . | . . . | . . . | . . . | . . . | . . . | . . . |
| | | 376 | 18 | 600 | | |
| CS11BC | SIZES | 377 | 1 | 15 | | |
| | | 377 | 2 | 20 | | |
| | | 377 | 3 | 25 | | |
| . . . | . . . | . . . | . . . | . . . | . . . | . . . |
| | | 377 | 19 | 300 | | |
| CS11BD | SIZES | 378 | 1 | 15 | | |
| | | 378 | 2 | 20 | | |
| | | 378 | 3 | 25 | | |
| . . . | . . . | . . . | . . . | . . . | . . . | . . . |
| | | 378 | 14 | 300 | | |
| CS11BE | SIZES | 379 | 1 | 200 | | |
| | | 379 | 2 | 250 | | |
| | | 379 | 3 | 300 | | |
| CS11BF | SIZES | 380 | 1 | 100 | | |
| | | 380 | 2 | 150 | | |
| | | 380 | 3 | 200 | | |
| | | 380 | 4 | 250 | | |
| | | 380 | 5 | 300 | | |
| CS11BG | SIZES | 381 | 1 | 25 | | |
| | | 381 | 2 | 32 | | |
| | | 381 | 3 | 40 | | |
| . . . | . . . | . . . | . . . | . . . | . . . | . . . |
| | | 381 | 18 | 600 | | |
| CS11BH | SIZES | 382 | 1 | 25 | | |
| | | 382 | 2 | 32 | | |
| | | 382 | 3 | 40 | | |
| . . . | . . . | . . . | . . . | . . . | . . . | . . . |
| | | 382 | 13 | 300 | | |
| CS11BI | | 383 | 1 | 25 | | |
| | | 383 | 2 | 32 | | |
| | | 383 | 3 | 40 | | |
| . . . | . . . | . . . | . . . | . . . | . . . | . . . |
| | | 383 | 17 | 600 | | |
| CS11BJ | SIZES | 384 | 1 | 25 | | |
| | | 384 | 2 | 32 | | |
| | | 384 | 3 | 40 | | |

-continued

| Menu | MENU SYSTEM | Menu No. | ITEM | DESCRIPTION | NEXT MENU | |
|---|---|---|---|---|---|---|
| | | 384 | 4 | 50 | | |
| | | 384 | 5 | 65 | | |
| | | 384 | 6 | 80 | | |
| CS11BK | SIZES | 385 | 1 | 15 | | |
| | | 385 | 2 | 20 | | |
| | | 385 | 3 | 25 | | |
| . . . | . . . | . . . | . . . | . . . | . . . | . . . |
| | | 385 | 8 | 80 | | |
| CS11BL | SIZES | 386 | 1 | 15 | | |
| | | 386 | 2 | 20 | | |
| | | 386 | 3 | 25 | | |
| . . . | . . . | . . . | . . . | . . . | . . . | . . . |
| | | 386 | 7 | 65 | | |
| CS11BM | SIZES | 387 | 1 | 650 | | |
| | | 387 | 2 | 700 | | |
| | | 387 | 3 | 750 | | |
| | | 387 | 4 | 800 | | |
| | | 387 | 5 | 850 | | |
| | | 387 | 6 | 900 | | |
| CS11BN | SIZES | 388 | 1 | 700 | | |
| | | 388 | 2 | 750 | | |
| | | 388 | 3 | 800 | | |
| | | 388 | 4 | 850 | | |
| | | 388 | 5 | 900 | | |
| CS11BO | SIZES | 389 | 1 | 800 | | |
| | | 389 | 2 | 850 | | |
| | | 389 | 3 | 900 | | |
| CS11BP | SIZES | 390 | 1 | 25 | | |
| | | 390 | 2 | 32 | | |
| | | 390 | 3 | 40 | | |
| . . . | . . . | . . . | . . . | . . . | . . . | . . . |
| | | 390 | 17 | 600 | | |
| CS11BQ | SIZES | 391 | 1 | 25 | | |
| | | 391 | 2 | 32 | | |
| | | 391 | 3 | 40 | | |
| . . . | . . . | . . . | . . . | . . . | . . . | . . . |
| | | 391 | 12 | 300 | | |
| CS11BR | SIZES | 392 | 1 | 25 | | |
| | | 392 | 2 | 40 | | |
| | | 392 | 3 | 50 | | |
| . . . | . . . | . . . | . . . | . . . | . . . | . . . |
| | | 392 | 10 | 350 | | |
| CS11BS | SIZES | 393 | 1 | 25 | | |
| | | 393 | 2 | 40 | | |
| | | 393 | 3 | 50 | | |
| | | 393 | 7 | 200 | | |
| CS11BT | SIZES | 394 | 1 | 25 | | |
| | | 394 | 2 | 40 | | |
| | | 394 | 3 | 50 | | |
| . . . | . . . | . . . | . . . | . . . | . . . | . . . |
| | | 394 | 14 | 600 | | |
| CS3E1 | TYPE | 395 | 1 | MACHINE BOLTS | CS4E1 | 396 |
| | | 395 | 2 | STUD BOLTS | CS4E2 | 397 |
| CS4E1 | DETAILS | 396 | 1 | Mc.BOLT SETS FOR FLGS. TO ANSI B16.5 | CS5E1 | 398 |
| | | 396 | 2 | Mc.BOLT SETS FOR FLGS. TO BS3293 | CS5E2 | 399 |
| | | 396 | 3 | Mc.BOLT SETS FOR FLGS. TO MSS-SP44 | CS5E3 | 400 |
| CS4E2 | DETAILS | 397 | 1 | STUD BOLT SETS FOR FLGS. TO ANSI B16.5 | CS5E4 | |
| | | 397 | 2 | STUD BOLT SETS FOR FLGS. TO BS3293 | CS5E5 | 402 |
| | | 397 | 3 | STUD BOLT SETS FOR FLGS. TO MSS-SP44 | CS5E6 | |
| | | 397 | 4 | STUD BOLT SETS (LT) FOR FLGS. TO ANSI B16.5 | CS5E7 | |
| | | 397 | 5 | STUD BOLT SETS (LT) FOR FLGS. TO BS3293 | CS5E8 | |
| | | 397 | 6 | STUD BOLT SETS (LT) FOR FLGS. TO MSS-SP44 | CS5E9 | |
| | | 397 | 7 | STUD BOLT SETS FOR FLGS. TO ANSI B16.36 | CS5E10 | |
| | | 397 | 8 | STUD BOLT SETS (LT) FOR FLGS. TO ANSI B16.36 | CS5E11 | |
| CS5E1 | STD. (DIM.) | 398 | 1 | ANSI B18.2 | CS6E1 | 409 |
| CS5E2 | STD. (DIM.) | 399 | 1 | ANSI B18.2 | CS6E2 | 410 |
| CS5E3 | STD. (DIM.) | 400 | 1 | ANSI B18.2 | CS6E3 | 411 |
| . . . | . . . | . . . | . . . | . . . | . . . | . . . |
| CS5E11 | STD. (DIM.) | 406 | 1 | ANSI B18.2 | CS6E11 | 419 |
| CS6E1 | STD. (MAT.) | 409 | 1 | ASTM A307 | CS7EN1 | 420 |
| CS6E2 | STD. (MAT.) | 410 | 1 | ASTM A307 | CS7EN2 | 421 |
| CS6E3 | STD. (MAT.) | 411 | 1 | ASTM A307 | CS7EN3 | 422 |
| CS6E4 | STD. (MAT.) | 412 | 1 | STUDS TO ASTM A193 | CS7E1 | 426 |
| | | 412 | 2 | NUTS TO ASTM A194 | CS7E2 | 424 |

-continued

| Menu | MENU SYSTEM | Menu No. | ITEM | DESCRIPTION | NEXT MENU | |
|---|---|---|---|---|---|---|
| | | | | CARBON STEEL TO AMERICAN STANDARDS | | |
| CS6E5 | STD. (MAT.) | 413 | 1 | STUDS TO ASTM A193 | CS7E3 | 425 |
| | | 413 | 2 | NUTS TO ASTM A194 | CS7E4 | 426 |
| CS6E6 | STD. (MAT.) | 414 | 1 | STUDS TO ASTM A193 | CS7E5 | 427 |
| | | 414 | 2 | NUTS TO ASTM A194 | CS7E6 | 428 |
| CS6E7 | STD. (MAT.) | 415 | 1 | STUDS TO ASTM A320 | CS7E7 | 429 |
| | | 415 | 2 | NUTS TO ASTM A320 | CS7E8 | 430 |
| CS6E8 | STD. (MAT.) | 416 | 1 | STUDS TO ASTM A320 | CS7E9 | 431 |
| | | 416 | 2 | NUTS TO ASTM A320 | CS7E10 | 432 |
| CS6E9 | STD. (MAT.) | 417 | 1 | STUDS TO ASTM A320 | CS7E11 | 433 |
| | | 417 | 2 | NUTS TO ASTM A320 | CS7E12 | 434 |
| CS6E10 | STD. (MAT.) | 418 | 1 | STUDS TO ASTM A193 | CS7E13 | 435 |
| | | 418 | 2 | NUTS TO ASTM A194 | CS7E14 | 436 |
| CS6E11 | STD. (MAT.) | 419 | 1 | STUDS TO ASTM A193 | CS7E15 | 437 |
| | | 419 | 2 | NUTS TO ASTM A194 | CS7E16 | 438 |
| CS7EN1 | | 420 | 1 | NOT APPLICABLE | CS8E1 | 439 |
| CS7EN2 | | 421 | 1 | NOT APPLICABLE | CS8E2 | 440 |
| CS7EN3 | | 422 | 1 | NOT APPLICABLE | CS8E3 | 441 |
| CS7E1 | GRADES | 423 | 1 | B7 | CS8E4 | 442 |
| CS7E2 | GRADES | 424 | 1 | 2H | CS8E4 | 442 |
| CS7E3 | GRADES | 435 | 1 | B7 | CS8E5 | 443 |
| ... | ... | ... | ... | ... | ... | ... |
| CS7E16 | GRADES | 438 | 1 | 2H | CS8E7 | 445 |
| CS8E1 | FINISH | 439 | 2 | BLACK | CS9E1 | 446 |
| CS8E2 | FINISH | 440 | 1 | BLACK | CS9E2 | 447 |
| CS8E3 | FINISH | 441 | 1 | BLACK | CS9E3 | 448 |
| CS8E4 | FINISH | 442 | 1 | BLACK | CS9E4 | 449 |
| CS8E5 | FINISH | 443 | 1 | BLACK | CS9E5 | 450 |
| CS8E6 | FINISH | 444 | 1 | BLACK | CS9E6 | 451 |
| CS8E7 | FINISH | 445 | 1 | BLACK | CS9E7 | 452 |
| CS9E1 | FLG. RATING | 446 | 1 | CLASS 150 RAISED FACE | CS10EN1 | 453 |
| | | 446 | 2 | CLASS 150 RING JOINT | CS10EN2 | 454 |
| | | 446 | 3 | CLASS 300 RAISED FACE | CS10EN3 | 455 |
| | | 446 | 4 | CLASS 300 RING JOINT | CS10EN4 | 456 |
| CS9E2 | FLG. RATING | 447 | 1 | CLASS 150 RAISED FACE | CS10EN5 | 457 |
| | | 447 | 2 | CLASS 300 RAISED FACE | CS10EN6 | 458 |
| | | 447 | 3 | CLASS 300 RING JOINT | CS10EN7 | 459 |
| CS9E3 | FLG. RATING | 448 | 1 | CLASS 150 RAISED FACE | CS10EN8 | 460 |
| | | 448 | 2 | CLASS 300 RAISED FACE | CS10EN9 | 461 |
| | | 448 | 3 | CLASS 300 RING JOINT | CS10EN10 | 462 |
| CS9E4 | FLG. RATING | 449 | 1 | CLASS 150 RAISED FACE | CS10EN11 | 463 |
| | | 449 | 2 | CLASS 150 RING JOINT | CS10EN12 | 464 |
| | | 449 | 3 | CLASS 300 RAISED FACE | CS10EN13 | 465 |
| ... | ... | ... | ... | ... | ... | ... |
| | | 449 | 12 | CLASS 2500 RING JOINT | CS10EN22 | 474 |
| CS9E5 | FLG. RATING | 450 | 1 | CLASS 160 RAISED FACE | CS10EN23 | 475 |
| | | 450 | 2 | CLASS 300 RAISED FACE | CS10EN24 | 476 |
| | | 450 | 3 | CLASS 300 RING JOINT | CS10EN25 | 477 |
| | | 450 | 4 | CLASS 600 RAISED FACE | CS10EN26 | 478 |
| | | 450 | 5 | CLASS 800 RING JOINT | CS10EN27 | 479 |
| CS9E6 | FLG. RATING | 451 | 1 | CLASS 150 RAISED FACE | CS10EN28 | 480 |
| | | 451 | 2 | CLASS 300 RAISED FACE | CS10EN29 | 481 |
| | | 451 | 3 | CLASS 300 RING JOINT | CS10EN30 | 482 |
| | | 451 | 4 | CLASS 600 RAISED FACE | CS10EN31 | 483 |
| | | 451 | 5 | CLASS 600 RING JOINT | CS10EN32 | 484 |
| | | 451 | 6 | CLASS 900 RAISED FACE | CS10EN33 | 485 |
| CS9E7 | FLG. RATING | 452 | 1 | CLASS 300 RAISED FACE | CS10EN34 | 486 |
| | | 452 | 2 | CLASS 300 RING JOINT | CS10EN35 | 487 |
| | | 452 | 3 | CLASS 600 RAISED FACE | CS10EN36 | 488 |
| | | 452 | 4 | CLASS 600 RING JOINT | CS10EN37 | 489 |
| CS10EN1 | | 453 | 1 | NOT APPLICABLE | CS11BU | 490 |
| CS10EN2 | | 454 | 1 | NOT APPLICABLE | CS11BV | 491 |
| CS10EN3 | | 455 | 1 | NOT APPLICABLE | CS11BW | 492 |
| ... | ... | ... | ... | ... | ... | ... |
| CS10EN37 | | 489 | 1 | NOT APPLICABLE | CS11DE | 526 |
| CS11BU | FLG. SIZES | 490 | 1 | 15 | CS12BU1 | |
| | | 490 | 2 | 20 | CS12BU2 | |
| | | 490 | 3 | 25 | CS12BU3 | |
| ... | ... | ... | ... | ... | ... | ... |
| | | 490 | 20 | 600 | CS12BU20 | |
| CS11BV | FLG. SIZES | 491 | 1 | 25 | CS12BV1 | |
| | | 491 | 2 | 32 | CS12BV2 | |
| | | 491 | 3 | 40 | CS12BV3 | |
| ... | ... | ... | ... | ... | ... | ... |
| | | 491 | 18 | 600 | CS12BV18 | |

-continued

| | MENU SYSTEM | | | CARBON STEEL TO AMERICAN STANDARDS | |
|---|---|---|---|---|---|
| Menu | | Menu No. | ITEM | DESCRIPTION | NEXT MENU |
| CS11BW | FLG. SIZES | 492 | 1 | 15 | CS12BW1 |
| | | 492 | 2 | 20 | CS12BW2 |
| | | 492 | 3 | 25 | CS12BW3 |
| . . . | . . . | . . . | . . . | . . . | . . . . . . |
| | | 492 | 20 | 600 | CS12BW20 |
| CS11BX | FLG. SIZES | 493 | 1 | 15 | CS12BX1 |
| | | 493 | 2 | 20 | CS12BX2 |
| | | 493 | 3 | 25 | CS12BX3 |
| . . . | . . . | . . . | . . . | . . . | . . . . . . |
| | | 493 | 20 | 600 | CS12BX20 |
| CS11BY | FLG. SIZES | 494 | 1 | 650 | CS12BY1 |
| | | 494 | 2 | 700 | CS12BY2 |
| | | 494 | 3 | 750 | CS12BY3 |
| | | 494 | 4 | 800 | CS12BY4 |
| | | 494 | 5 | 850 | CS12BY5 |
| | | 494 | 6 | 900 | CS12BY6 |
| CS11BZ | FLG. SIZES | 495 | 1 | 650 | CS12BZ1 |
| | | 495 | 2 | 700 | CS12BZ2 |
| | | 495 | 3 | 750 | CS12BZ3 |
| | | 495 | 4 | 800 | CS12BZ4 |
| | | 495 | 5 | 850 | CS12BZ5 |
| | | 495 | 6 | 900 | CS12BZ6 |
| CS11CA | FLG. SIZES | 496 | 1 | 650 | CS12CA1 |
| | | 496 | 2 | 700 | CS12CA2 |
| | | 496 | 3 | 750 | CS12CA3 |
| | | 496 | 4 | 800 | CS12CA4 |
| | | 496 | 5 | 850 | CS12CA5 |
| | | 496 | 6 | 900 | CS12CA6 |
| CS11CB | FLG. SIZES | 497 | 1 | 650 | CS12CB1 |
| | | 497 | 2 | 700 | CS12CB2 |
| | | 497 | 3 | 750 | CS12CB3 |
| | | 497 | 4 | 800 | CS12CB4 |
| | | 497 | 5 | 850 | CS12CB5 |
| | | 497 | 6 | 900 | CS12CB6 |
| CS11CC | FLG. SIZES | 498 | 1 | 650 | CS12CC1 |
| | | 498 | 2 | 700 | CS12CC2 |
| | | 498 | 3 | 750 | CS12CC3 |
| | | 498 | 4 | 800 | CS12CC4 |
| | | 498 | 5 | 850 | CS12CC5 |
| | | 498 | 6 | 900 | CS12CC6 |
| CS11CD | FLG. SIZES | 499 | 1 | 650 | CS12CD1 |
| | | 499 | 2 | 700 | CS12CD2 |
| | | 499 | 3 | 750 | CS12CD3 |
| | | 499 | 4 | 800 | CS12CD4 |
| | | 499 | 5 | 850 | CS12CD5 |
| | | 499 | 6 | 900 | CS12CD6 |
| CS11CE | FLG. SIZES | 500 | 1 | 15 | CS12CE1 |
| | | 500 | 2 | 20 | CS12CE2 |
| | | 500 | 3 | 25 | CS12CE3 |
| . . . | . . . | . . . | . . . | . . . | . . . . . . |
| | | 500 | 20 | 600 | CS12CE20 |
| CS11CF | FLG. SIZES | 501 | 1 | 25 | CS12CF1 |
| | | 501 | 2 | 32 | CS12CF2 |
| | | 501 | 3 | 40 | CS12CF3 |
| . . . | . . . | . . . | . . . | . . . | . . . . . . |
| | | 501 | 18 | 800 | CS12CF18 |
| CS11CG | FLG. SIZES | 502 | 1 | 15 | CS12CG1 |
| | | 502 | 2 | 20 | CS12CG2 |
| | | 502 | 3 | 25 | CS12CG3 |
| . . . | . . . | . . . | . . . | . . . | . . . . . . |
| | | 502 | 20 | 600 | CS12CG20 |
| CS11CH | FLG. SIZES | 503 | 1 | 15 | CS12CH1 |
| | | 503 | 2 | 20 | CS12CH2 |
| | | 503 | 3 | 25 | CS12CH3 |
| . . . | . . . | . . . | . . . | . . . | . . . . . . |
| | | 503 | 20 | 600 | CS12CH20 |
| CS11CI | FLG. SIZES | 504 | 1 | 15 | CS12CI1 |
| | | 504 | 2 | 20 | CS12CI2 |
| | | 504 | 3 | 25 | CS12CI3 |
| . . . | . . . | . . . | . . . | . . . | . . . . . . |
| | | 504 | 20 | 600 | CS12CI20 |
| CS11CJ | FLG. SIZES | 505 | 1 | 15 | CS12CJ1 |
| | | 505 | 2 | 20 | CS12CJ2 |
| | | 505 | 3 | 25 | CS12CJ3 |

-continued

| MENU SYSTEM | | | | CARBON STEEL TO AMERICAN STANDARDS | |
|---|---|---|---|---|---|
| Menu | | Menu No. | ITEM | DESCRIPTION | NEXT MENU |
| ... | ... | ... | ... | ... | ... ... |
| | | 505 | 20 | 600 | CS12CJ20 |
| CS11CK | FLG. SIZES | 506 | 1 | 15 | CS12CK1 |
| | | 506 | 2 | 20 | CS12CK2 |
| | | 506 | 3 | 25 | CS12CK3 |
| ... | ... | ... | ... | ... | ... ... |
| | | 506 | 19 | 600 | CS12CK19 |
| CS11CL | FLG. SIZES | 507 | 1 | 15 | CS12CL1 |
| | | 507 | 2 | 20 | CS12CL2 |
| | | 507 | 3 | 25 | CS12CL3 |
| ... | ... | ... | ... | ... | ... ... |
| | | 507 | 19 | 600 | CS12CL19 |
| CS11CM | FLG. SIZES | 508 | 1 | 15 | CS12CM1 |
| | | 508 | 2 | 20 | CS12CM2 |
| | | 508 | 3 | 25 | CS12CM3 |
| ... | ... | ... | ... | ... | ... ... |
| | | 508 | 19 | 600 | CS12CM19 |
| CS11CN | FLG. SIZES | 509 | 1 | 15 | CS12CN1 |
| | | 509 | 2 | 20 | CS12CN2 |
| | | 509 | 3 | 25 | CS12CN3 |
| ... | ... | ... | ... | ... | ... ... |
| | | 509 | 19 | 600 | CS12CN19 |
| CS11CO | FLG. SIZES | 510 | 1 | 15 | CS12CO1 |
| | | 510 | 2 | 20 | CS12CO2 |
| | | 510 | 3 | 25 | CS12CO3 |
| ... | ... | ... | ... | ... | ... ... |
| | | 510 | 14 | 300 | CS12CO14 |
| CS11CP | FLG. SIZES | 511 | 1 | 15 | CS12CP1 |
| | | 511 | 2 | 20 | CS12CP2 |
| | | 511 | 3 | 25 | CS12CP3 |
| ... | ... | ... | ... | ... | ... ... |
| | | 511 | 14 | 300 | CS12CP14 |
| CS11CQ | FLG. SIZES | 512 | 1 | 650 | CS12CQ1 |
| | | 512 | 2 | 700 | CS12CQ2 |
| | | 512 | 3 | 750 | CS12CQ3 |
| | | 512 | 4 | 800 | CS12CQ4 |
| | | 512 | 5 | 850 | CS12CQ5 |
| | | 512 | 6 | 900 | CS12CQ6 |
| CS11CR | FLG. SIZES | 513 | 1 | 650 | CS12CR1 |
| | | 513 | 2 | 700 | CS12CR2 |
| | | 513 | 3 | 750 | CS12CR3 |
| | | 513 | 4 | 800 | CS12CR4 |
| | | 513 | 5 | 850 | CS12CR5 |
| | | 513 | 6 | 900 | CS12CR6 |
| CS11CS | FLG. SIZES | 514 | 1 | 650 | CS12CS1 |
| | | 514 | 2 | 700 | CS12CS2 |
| | | 514 | 3 | 750 | CS12CS3 |
| | | 514 | 4 | 800 | CS12CS4 |
| | | 514 | 5 | 850 | CS12CS5 |
| | | 514 | 6 | 900 | CS12CS6 |
| CS11CT | FLG. SIZES | 515 | 1 | 650 | CS12CT1 |
| | | 515 | 2 | 700 | CS12CT2 |
| | | 515 | 3 | 750 | CS12CT3 |
| | | 515 | 4 | 800 | CS12CT4 |
| | | 515 | 5 | 850 | CS12CT5 |
| | | 515 | 6 | 900 | CS12CT6 |
| CS11CU | FLG. SIZES | 516 | 1 | 650 | CS12CU1 |
| | | 516 | 2 | 700 | CS12CU2 |
| | | 516 | 3 | 750 | CS12CU3 |
| | | 516 | 4 | 800 | CS12CU4 |
| | | 516 | 5 | 850 | CS12CU5 |
| | | 516 | 6 | 900 | CS12CU6 |
| CS11CV | FLG. SIZES | 517 | 1 | 650 | CS12CV1 |
| | | 517 | 2 | 700 | CS12CV2 |
| | | 517 | 3 | 750 | CS12CV3 |
| | | 517 | 4 | 800 | CS12CV4 |
| | | 517 | 5 | 850 | CS12CV5 |
| | | 517 | 6 | 900 | CS12CV6 |
| CS11CW | FLG. SIZES | 518 | 1 | 650 | CS12CW1 |
| | | 518 | 2 | 700 | CS12CW2 |
| | | 518 | 3 | 750 | CS12CW3 |
| | | 518 | 4 | 800 | CS12CW4 |
| | | 518 | 5 | 850 | CS12CW5 |
| | | 518 | 6 | 900 | CS12CW6 |

-continued

| MENU SYSTEM | | | | CARBON STEEL TO AMERICAN STANDARDS | |
|---|---|---|---|---|---|
| Menu | | Menu No. | ITEM | DESCRIPTION | NEXT MENU |
| CS11CX | FLG. SIZES | 519 | 1 | 650 | CS12CX1 |
| | | 519 | 2 | 700 | CS12CX2 |
| | | 519 | 3 | 750 | CS12CX3 |
| | | 519 | 4 | 800 | CS12CX4 |
| | | 519 | 5 | 850 | CS12CX5 |
| | | 519 | 6 | 900 | CS12CX6 |
| CS11CY | FLG. SIZES | 520 | 1 | 650 | CS12CY1 |
| | | 520 | 2 | 700 | CS12CY2 |
| | | 520 | 3 | 750 | CS12CY3 |
| | | 520 | 4 | 800 | CS12CY4 |
| | | 520 | 5 | 850 | CS12CY5 |
| | | 520 | 6 | 900 | CS12CY6 |
| CS11CZ | FLG. SIZES | 521 | 1 | 650 | CS12CZ1 |
| | | 521 | 2 | 700 | CS12CZ2 |
| | | 521 | 3 | 750 | CS12CZ3 |
| | | 521 | 4 | 800 | CS12CZ4 |
| | | 521 | 5 | 850 | CS12CZ5 |
| | | 521 | 6 | 900 | CS12CZ6 |
| CS11DA | FLG. SIZES | 522 | 1 | 650 | CS12DA1 |
| | | 522 | 2 | 700 | CS12DA2 |
| | | 522 | 3 | 750 | CS12DA3 |
| | | 522 | 4 | 800 | CS12DA4 |
| | | 522 | 5 | 850 | CS12DA5 |
| | | 522 | 6 | 900 | CS12DA6 |
| CS11DB | FLG. SIZES | 523 | 1 | 25 | CS12DB1 |
| | | 523 | 2 | 32 | CS12DB2 |
| | | 523 | 3 | 40 | CS12DB3 |
| . . . | . . . | . . . | . . . | . . . | . . . |
| | | 523 | 17 | 600 | CS12DB17 |
| CS11DC | FLG. SIZES | 524 | 1 | 25 | CS12DC1 |
| | | 524 | 2 | 32 | CS12DC2 |
| | | 524 | 3 | 40 | CS12DC3 |
| | | 524 | 4 | 50 | CS12DC4 |
| . . . | . . . | . . . | . . . | . . . | . . . |
| | | 524 | 16 | 500 | CS12DC16 |
| | | 524 | 17 | 600 | CS12DC17 |
| CS11DD | FLG. SIZES | 525 | 1 | 25 | CS12DD1 |
| | | 525 | 2 | 32 | CS12DD2 |
| | | 525 | 3 | 40 | CS12DD3 |
| | | 525 | 4 | 50 | CS12DD4 |
| . . . | . . . | . . . | . . . | . . . | . . . |
| | | 525 | 16 | 500 | CS12DD16 |
| | | 525 | 17 | 600 | CS12DD17 |
| CS11DE | FLG. SIZES | 526 | 1 | 25 | CS12DE1 |
| | | 526 | 2 | 32 | CS12DE2 |
| | | 526 | 3 | 40 | CS12DE3 |
| | | 526 | 4 | 50 | CS12DE4 |
| . . . | . . . | . . . | . . . | . . . | . . . |
| | | 526 | 16 | 500 | CS12DE16 |
| | | 526 | 17 | 600 | CS12DE17 |
| CS12BU1 | BOLT SIZES | | 1 | ½ DIA. × 45 mm LG | |
| CS12BU2 | | | 2 | ½ DIA. × 50 mm LG | |
| CS12BU3 | | | 3 | ½ DIA. × 56 mm LG | |
| CS12BU4 | | | 4 | ½ DIA. × 55 mm LG | |
| . . . | . . . | . . . | . . . | . . . | . . . |
| CS12BU19 | | | 19 | 1-⅛ DIA. × 135 mm LG | |
| CS12BU20 | | | 20 | 1-¼ DIA. × 145 mm LG | |
| CS12BV1 | BOLT SIZES | | 1 | ½ DIA. × 70 mm LG | |
| CS12BV2 | | | 2 | ½ DIA. × 70 mm LG | |
| CS12BV3 | | | 3 | ½ DIA. × 75 mm LG | |
| CS12BV4 | | | 4 | ⅝ DIA. × 80 mm LG | |
| . . . | . . . | . . . | . . . | . . . | . . . |
| CS12BV17 | | | 17 | 1-⅛ DIA. × 150 mm LG | |
| CS12BV18 | | | 18 | 1-¼ DIA. × 160 mm LG | |
| CS12BW1 | BOLT SIZES | | 1 | ½ DIA. × 55 mm LG | |
| CS12BW2 | | | 2 | ⅝ DIA. × 60 mm LG | |
| CS12BW3 | | | 3 | ⅝ DIA. × 65 mm LG | |
| CS12BW4 | | | 4 | ⅝ DIA. × 65 mm LG | |
| . . . | . . . | . . . | . . . | . . . | . . . |
| CS12BW19 | | | 19 | 1-¼ DIA. × 180 mm LG | |
| CS12BW20 | | | 20 | 1-½ DIA. × 195 mm LG | |
| CS12BX1 | BOLT SIZES | | 1 | ½ DIA. × 70 mm LG | |
| CS12BX2 | | | 2 | ⅝ DIA. × 75 mm LG | |
| CS12BX3 | | | 3 | ⅝ DIA. × 80 mm LG | |

-continued

| | MENU SYSTEM | | | CARBON STEEL TO AMERICAN STANDARDS | |
|---|---|---|---|---|---|
| Menu | Menu No. | ITEM | DESCRIPTION | | NEXT MENU |
| CS12BX4 | | 4 | ⅝ DIA. × 80 mm LG | | |
| ... | ... | ... | ... | ... | ... |
| CS12BX19 | | 19 | 1-¼ DIA. × 205 mm LG | | |
| CS12BX20 | | 20 | 1-½ DIA. × 220 mm LG | | |
| CS12BY1 | BOLT SIZES | 1 | 1-¼ DIA. × 145 mm LG | | |
| CS12BY2 | | 2 | 1-¼ DIA. × 150 mm LG | | |
| CS12BY3 | | 3 | 1-¼ DIA. × 160 mm LG | | |
| CS12BY4 | | 4 | 1-½ DIA. × 165 mm LG | | |
| CS12BY5 | | 5 | 1-½ DIA. × 170 mm LG | | |
| CS12BY6 | | 6 | 1-½ DIA. × 180 mm LG | | |
| CS12BZ1 | BOLT SIZES | 1 | 1-⅝ DIA. × 210 mm LG | | |
| CS12BZ2 | | 2 | 1-⅝ DIA. × 225 mm LG | | |
| CS12BZ3 | | 3 | 1-¾ DIA. × 250 mm LG | | |
| CS12BZ4 | | 4 | 1-⅞ DIA. × 255 mm LG | | |
| CS12BZ5 | | 5 | 1-⅞ DIA. × 260 mm LG | | |
| CS12BZ6 | | 6 | 2 DIA. × 280 mm LG | | |
| CS12CA1 | BOLT SIZES | 1 | 1-⅝ DIA. × 240 mm LG | | |
| CS12CA2 | | 2 | 1-⅝ DIA. × 255 mm LG | | |
| CS12CA3 | | 3 | 1-¾ DIA. × 280 mm LG | | |
| CS12CA4 | | 4 | 1-⅞ DIA. × 290 mm LG | | |
| CS12CA5 | | 5 | 1-⅞ DIA. × 295 mm LG | | |
| CS12CA6 | | 6 | 2 DIA. × 315 mm LG | | |
| CS12CB1 | BOLT SIZES | 1 | 1-¼ DIA. × 180 mm LG | | |
| CS12CB2 | | 2 | 1-¼ DIA. × 185 mm LG | | |
| CS12CB3 | | 3 | 1-¼ DIA. × 195 mm LG | | |
| CS12CB4 | | 4 | 1-½ DIA. × 210 mm LG | | |
| CS12CB5 | | 5 | 1-½ DIA. × 215 mm LG | | |
| CS12CB6 | | 6 | 1-½ DIA. × 230 mm LG | | |
| CS12CC1 | BOLT SIZES | 1 | 1-⅝ DIA. × 210 mm LG | | |
| CS12CC2 | | 2 | 1-⅝ DIA. × 225 mm LG | | |
| CS12CC3 | | 3 | 1-¾ DIA. × 250 mm LG | | |
| CS12CC4 | | 4 | 1-⅞ DIA. × 255 mm LG | | |
| CS12CC5 | | 5 | 1-⅞ DIA. × 260 mm LG | | |
| CS12CC6 | | 6 | 2 DIA. × 280 mm LG | | |
| CS12CD1 | BOLT SIZES | 1 | 1-⅝ DIA. × 240 mm LG | | |
| CS12CD2 | | 2 | 1-⅝ DIA. × 255 mm LG | | |
| CS12CD3 | | 3 | 1-¾ DIA. × 280 mm LG | | |
| CS12CD4 | | 4 | 1-⅞ DIA. × 290 mm LG | | |
| CS12CD5 | | 5 | 1-⅞ DIA. × 295 mm LG | | |
| CS12CD6 | | 6 | 2 DIA. × 315 mm LG | | |
| CS12CE1 | BOLT SIZES | 1 | 1-½ DIA. × 60 mm LG | | |
| CS12CE2 | | 2 | 1-½ DIA. × 65 mm LG | | |
| CS12CE3 | | 3 | 1-½ DIA. × 65 mm LG | | |
| CS12CE4 | | 4 | 1-½ DIA. × 70 mm LG | | |
| ... | ... | ... | ... | ... | ... |
| CS12CE19 | | 19 | 1-⅛ DIA. × 160 mm LG | | |
| CS12CE20 | | 20 | 1-¼ DIA. × 170 mm LG | | |
| CS12CF1 | BOLT SIZES | 1 | ½ DIA. × 80 mm LG | | |
| CS12CF2 | | 2 | ½ DIA. × 85 mm LG | | |
| CS12CF3 | | 3 | ½ DIA. × 85 mm LG | | |
| CS12CF4 | | 4 | ⅝ DIA. × 100 mm LG | | |
| ... | ... | ... | ... | ... | ... |
| CS12CF17 | | 17 | 1-⅛ DIA. × 175 mm LG | | |
| CS12CF18 | | 18 | 1-¼ DIA. × 185 mm LG | | |
| CS12CG1 | BOLT SIZES | 1 | ½ DIA. × 65 mm LG | | |
| CS12CG2 | | 2 | ⅝ DIA. × 75 mm LG | | |
| CS12CG3 | | 3 | ⅝ DIA. × 75 mm LG | | |
| CS12CG4 | | 4 | ⅝ DIA. × 85 mm LG | | |
| ... | ... | ... | ... | ... | ... |
| CS12CG19 | | 19 | 1-¼ DIA. × 205 mm LG | | |
| CS12CG20 | | 20 | 1-½ DIA. × 230 mm LG | | |
| CS12CH1 | BOLT SIZES | 1 | ½ DIA. × 80 mm LG | | |
| CS12CH2 | | 2 | ⅝ DIA. × 90 mm LG | | |
| CS12CH3 | | 3 | ⅝ DIA. × 90 mm LG | | |
| CS12CH4 | | 4 | ⅝ DIA. × 100 mm LG | | |
| ... | ... | ... | ... | ... | ... |
| CS12CH19 | | 19 | 1-¼ DIA. × 230 mm LG | | |
| CS12CH20 | | 20 | 1-½ DIA. × 255 mm LG | | |
| CS12CI1 | BOLT SIZES | 1 | ½ DIA. × 75 mm LG | | |
| CS12CI2 | | 2 | ⅝ DIA. × 90 mm LG | | |
| CS12CI3 | | 3 | ⅝ DIA. × 90 mm LG | | |
| CS12CI4 | | 4 | ⅝ DIA. × 95 mm LG | | |
| ... | ... | ... | ... | ... | ... |
| CS12CI19 | | 19 | 1-⅝ DIA. × 285 mm LG | | |

-continued

| MENU SYSTEM | | | CARBON STEEL TO AMERICAN STANDARDS | |
|---|---|---|---|---|
| Menu | Menu No. | ITEM | DESCRIPTION | NEXT MENU |
| CS12CI20 | | 20 | 1-⅞ DIA. × 330 mm LG | |
| CS12CJ1 | BOLT SIZES | 1 | ½ DIA. × 80 mm LG | |
| CS12CJ2 | | 2 | ⅝ DIA. × 95 mm LG | |
| CS12CJ3 | | 3 | ⅝ DIA. × 95 mm LG | |
| CS12J4 | | 4 | ⅝ DIA. × 100 mm LG | |
| ... | ... | ... | ... | ... ... |
| CS12J19 | | 19 | 1-⅝ DIA. × 300 mm LG | |
| CS12J20 | | 20 | 1-⅞ DIA. × 345 mm LG | |
| CS12CK1 | BOLT SIZES | 1 | ¾ DIA. × 110 mm LG | |
| CS12CK2 | | 2 | ¾ DIA. × 115 mm LG | |
| CS12CK3 | | 3 | ⅞ DIA. × 130 mm LG | |
| CS12CK4 | | 4 | ⅞ DIA. × 130 mm LG | |
| ... | ... | ... | ... | ... ... |
| CS12CK18 | | 18 | 1-⅞ DIA. × 350 mm LG | |
| CS12CK19 | | 19 | 2-½ DIA. × 440 mm LG | |
| CS12CL1 | BOLT SIZES | 1 | ¾ DIA. × 115 mm LG | |
| CS12CL2 | | 2 | ¾ DIA. × 120 mm LG | |
| CS12CL3 | | 3 | ⅞ DIA. × 135 mm LG | |
| CS12CL4 | | 4 | ⅞ DIA. × 135 mm LG | |
| ... | ... | ... | ... | ... ... |
| CS12CL18 | | 18 | 1-⅞ DIA. × 370 mm LG | |
| CS12CL19 | | 19 | 2-½ DIA. × 470 mm LG | |
| CS12CM1 | BOLT SIZES | 1 | ¾ DIA. × 110 mm LG | |
| CS12CM2 | | 2 | ¾ DIA. × 115 mm LG | |
| CS12CM3 | | 3 | ⅞ DIA. × 130 mm LG | |
| CS12CM4 | | 4 | ⅞ DIA. × 130 mm LG | |
| ... | ... | ... | ... | ... ... |
| CS12CM18 | | 18 | 3 DIA. × 540 mm LG | |
| CS12CM19 | | 19 | 3-½ DIA. × 815 mm LG | |
| CS12CN1 | BOLT SIZES | 1 | ¾ DIA. × 115 mm LG | |
| CS12CN2 | | 2 | ¾ DIA. × 120 mm LG | |
| CS12CN3 | | 3 | ⅞ DIA. × 135 mm LG | |
| CS12CN4 | | 4 | ⅞ DIA. × 135 mm LG | |
| ... | ... | ... | ... | ... ... |
| CS12CN18 | | 18 | 3 DIA. × 575 mm LG | |
| CS12CN19 | | 19 | 3-½ DIA. × 660 mm LG | |
| CS12CO1 | BOLT SIZES | 1 | ¾ DIA. × 120 mm LG | |
| CS12CO2 | | 2 | ¾ DIA. × 130 mm LG | |
| CS12CO3 | | 3 | ⅞ DIA. × 140 mm LG | |
| CS12CO4 | | 4 | 1 DIA. × 155 mm LG | |
| ... | ... | ... | ... | ... ... |
| CS12CO18 | | 18 | 2-½ DIA. × 490 mm LG | |
| CS12CO19 | | 19 | 2-¾ DIA. × 540 mm LG | |
| CS12CP1 | BOLT SIZES | 1 | ¾ DIA. × 125 mm LG | |
| CS12CP2 | | 2 | ¾ DIA. × 135 mm LG | |
| CS12CP3 | | 3 | ⅞ DIA. × 145 mm LG | |
| CS12CP4 | | 4 | 1 DIA. × 165 mm LG | |
| ... | ... | ... | ... | ... ... |
| CS12CP13 | | 13 | 2-½ DIA. × 525 mm LG | |
| CS12CP14 | | 14 | 2-¾ DIA. × 575 mm LG | |
| CS12CQ1 | BOLT SIZES | 1 | 1-¼ DIA. × 170 mm LG | |
| CS12CQ2 | | 2 | 1-¼ DIA. × 180 mm LG | |
| CS12CQ3 | | 3 | 1-¼ DIA. × 180 mm LG | |
| CS12CQ4 | | 4 | 1-½ DIA. × 200 mm LG | |
| CS12CQ5 | | 5 | 1-½ DIA. × 205 mm LG | |
| CS12CQ6 | | 6 | 1-½ DIA. × 205 mm LG | |
| CS12CR1 | BOLT SIZES | 1 | 1-⅝ DIA. × 250 mm LG | |
| CS12CR2 | | 2 | 1-⅝ DIA. × 260 mm LG | |
| CS12CR3 | | 3 | 1-¾ DIA. × 280 mm LG | |
| CS12CR4 | | 4 | 1-⅞ DIA. × 300 mm LG | |
| CS12CR5 | | 5 | 1-⅞ DIA. × 305 mm LG | |
| CS12CR6 | | 6 | 2 DIA. × 320 mm LG | |
| CS12CS1 | BOLT SIZES | 1 | 1-⅝ DIA. × 280 mm LG | |
| CS12CS2 | | 2 | 1-⅝ DIA. × 290 mm LG | |
| CS12CS3 | | 3 | 1-¾ DIA. × 310 mm LG | |
| CS12CS4 | | 4 | 1-⅞ DIA. × 335 mm LG | |
| CS12CS5 | | 5 | 1-⅞ DIA. × 340 mm LG | |
| CS12CS6 | | 6 | 2 DIA. × 355 mm LG | |
| CS12CT1 | BOLT SIZES | 1 | 1-⅞ DIA. × 330 mm LG | |
| CS12CT2 | | 2 | 2 DIA. × 345 mm LG | |
| CS12CT3 | | 3 | 2 DIA. × 350 mm LG | |
| CS12CT4 | | 4 | 2-¼ DIA. × 370 mm LG | |
| CS12CT5 | | 5 | 2-¼ DIA. × 375 mm LG | |
| CS12CT6 | | 6 | 2-½ DIA. × 395 mm LG | |

-continued

| Menu | MENU SYSTEM<br>Menu<br>No. | ITEM | CARBON STEEL TO AMERICAN STANDARDS<br>DESCRIPTION | NEXT MENU | |
|---|---|---|---|---|---|
| CS12CU1 | BOLT SIZES | 1 | 1-⅞ DIA. × 350 mm LG | | |
| CS12CU2 | | 2 | 2 DIA. × 365 mm LG | | |
| CS12CU3 | | 3 | 2 DIA. × 370 mm LG | | |
| CS12CU4 | | 4 | 2-¼ DIA. × 395 mm LG | | |
| CS12CU5 | | 5 | 2-¼ DIA. × 400 mm LG | | |
| CS12CU6 | | 6 | 2-½ DIA. × 420 mm LG | | |
| CS12CV1 | BOLT SIZES | 1 | 1-¼ DIA. × 205 mm LG | | |
| CS12CV2 | | 2 | 1-¼ DIA. × 220 mm LG | | |
| CS12CV3 | | 3 | 1-¼ DIA. × 225 mm LG | | |
| CS12CV4 | | 4 | 1-½ DIA. × 250 mm LG | | |
| CS12CV5 | | 5 | 1-½ DIA. × 255 mm LG | | |
| CS12CV6 | | 6 | 1-½ DIA. × 265 mm LG | | |
| CS12CW1 | BOLT SIZES | 1 | 1-⅝ DIA. × 250 mm LG | | |
| CS12CW2 | | 2 | 1-⅝ DIA. × 280 mm LG | | |
| CS12CW3 | | 3 | 1-¾ DIA. × 280 mm LG | | |
| CS12CW4 | | 4 | 1-⅞ DIA. × 300 mm LG | | |
| CS12CW5 | | 5 | 1-⅞ DIA. × 305 mm LG | | |
| CS12CW6 | | 6 | 2 DIA. × 320 mm LG | | |
| CS12CX1 | BOLT SIZES | 1 | 1-⅝ DIA. × 280 mm LG | | |
| CS12CX2 | | 2 | 1-⅝ DIA. × 290 mm LG | | |
| CS12CX3 | | 3 | 1-¾ DIA. × 310 mm LG | | |
| CS12CX4 | | 4 | 1-⅞ DIA. × 335 mm LG | | |
| CS12CX5 | | 5 | 1-⅞ DIA. × 340 mm LG | | |
| CS12CX6 | | 6 | 2 DIA. × 355 mm LG | | |
| CS12CY1 | BOLT SIZES | 1 | 1-⅞ DIA. × 330 mm LG | | |
| CS12CY2 | | 2 | 2 DIA. × 345 mm LG | | |
| CS12CY3 | | 3 | 2 DIA. × 350 mm LG | | |
| CS12CY4 | | 4 | 2-¼ DIA. × 370 mm LG | | |
| CS12CY5 | | 5 | 2-¼ DIA. × 375 mm LG | | |
| CS12CY6 | | 6 | 2-½ DIA. × 395 mm LG | | |
| CS12CZ1 | BOLT SIZES | 1 | 1-⅞ DIA. × 350 mm LG | | |
| CS12CZ2 | | 2 | 2 DIA. × 365 mm LG | | |
| CS12CZ3 | | 3 | 2 DIA. × 370 mm LG | | |
| CS12CZ4 | | 4 | 2-¼ DIA. × 395 mm LG | | |
| CS12CZ5 | | 5 | 2-¼ DIA. × 400 mm LG | | |
| CS12CZ6 | | 6 | 2-½ DIA. × 420 mm LG | | |
| CS12DA1 | BOLT SIZES | 1 | 2-¾ DIA. × 450 mm LG | | |
| CS12DA2 | | 2 | 3 DIA. × 470 mm LG | | |
| CS12DA3 | | 3 | 3 DIA. × 480 mm LG | | |
| CS12DA4 | | 4 | 3-¼ DIA. × 500 mm LG | | |
| CS12DA5 | | 5 | 3-½ DIA. × 525 mm LG | | |
| CS12DA6 | | 6 | 3-½ DIA. × 540 mm LG | | |
| CS12DB1 | BOLT SIZES | 1 | ⅝ DIA. × 130 mm LG | | |
| CS12DB2 | | 2 | ⅝ DIA. × 130 mm LG | | |
| CS12DB3 | | 3 | ¾ DIA. × 135 mm LG | | |
| CS12DB4 | | 4 | ⅝ DIA. × 130 mm LG | | |
| . . . | . . . | ... | . . . | . . . | . . . |
| CS12DB16 | | 16 | 1-¼ DIA. × 215 mm LG | | |
| CS12DB17 | | 17 | 1-½ DIA. × 245 mm LG | | |
| CS12DC1 | BOLT SIZES | 1 | ⅝ DIA. × 145 mm LG | | |
| CS12DC2 | | 2 | ⅝ DIA. × 145 mm LG | | |
| CS12DC3 | | 3 | ¾ DIA. × 150 mm LG | | |
| CS12DC4 | | 4 | ⅝ DIA. × 150 mm LG | | |
| . . . | . . . | ... | . . . | . . . | . . . |
| CS12DC16 | | 16 | 1-¼ DIA. × 240 mm LG | | |
| CS12DC17 | | 17 | 1-½ DIA. × 270 mm LG | | |
| CS12DD1 | BOLT SIZES | 1 | ⅝ DIA. × 130 mm LG | | |
| CS12DD2 | | 2 | ⅝ DIA. × 130 mm LG | | |
| CS12DD3 | | 3 | ¾ DIA. × 135 mm LG | | |
| CS12DC4 | | 4 | ⅝ DIA. × 130 mm LG | | |
| . . . | . . . | ... | . . . | . . . | . . . |
| CS12DD16 | | 16 | 1-⅝ DIA. × 300 mm LG | | |
| CS12DD17 | | 17 | 1-⅞ DIA. × 340 mm LG | | |
| CS12DE1 | BOLT SIZES | 1 | ⅝ DIA. × 135 mm LG | | |
| CS12DE2 | | 2 | ⅝ DIA. × 135 mm LG | | |
| CS12DE3 | | 3 | ¾ DIA. × 140 mm LG | | |
| CS12DC4 | | 4 | ⅝ DIA. × 140 mm LG | | |
| . . . | . . . | ... | . . . | . . . | . . . |
| CS12DE16 | | 16 | 1-⅝ DIA. × 315 mm LG | | |
| CS12DE17 | | 17 | 1-⅞ DIA. × 355 mm LG | | |
| CS3F1 | TYPE | 527 | 1 | COMPRESSED FIBRE | CS4F1 | 528 |

-continued

| Menu | MENU SYSTEM | Menu No. | ITEM | DESCRIPTION | NEXT MENU | |
|---|---|---|---|---|---|---|
| | | 527 | 2 | SPIRAL WOUND | CS4F2 | 529 |
| | | 527 | 3 | METAL RING JOINT | CS4F3 | 530 |
| | | 527 | 4 | INSULATING SETS | CS4F4 | 531 |
| CS4F1 | DETAILS | 528 | 1 | KLINGER SIL C4210 FULL FACE | CS5FN1 | 532 |
| | | 528 | 2 | KLINGER SIL C4400 FULL FACE | CSFFN1 | 532 |
| | | 528 | 3 | KLINGER SIL C4430 FULL FACE | CS5FN1 | 532 |
| | | 528 | 4 | KLINGER SIL C4500 FULL FACE | CS5FN1 | 532 |
| ... | ... | ... | ... | ... | ... | ... |
| | | 528 | 11 | KLINGER SIL C6327 RING JOINT | CS5FN1 | 532 |
| | | 528 | 12 | KLINGER SIL C8200 RING JOINT | CS5FN1 | 532 |
| CS4F2 | DETAILS | 529 | 1 | TYPE CR & CRIR FOR FLGS. TO ANSI B16.5 | CS5FN2 | |
| | | 529 | 2 | TYPE CR & CRIR FOR FLGS. TO MSS-SP44 | CS5FN3 | |
| | | 529 | 3 | TYPE CR & CRIR FOR FLGS. TO BS3293 | CS5FN4 | 535 |
| CS4F3 | DETAIL5 | 530 | 1 | RTJ TYPE R (OVAL) FOR FLGS. TO 600 DIA. | CS5FN5 | |
| | | 530 | 2 | RTJ TYPE R (OCTAGONAL) FLGS. TO 600 DIA. | CS5FN5 | |
| | | 530 | 3 | RTJ TYPE R (OVAL) FLGS. ABOVE 600 DIA. | CS5FN6 | |
| | | 530 | 4 | RTJ TYPE R (OCTAGONAL) FLGS. ABOVE 600 DIA. | CS5FN6 | |
| CS4F4 | DETAILS | 531 | 1 | TYPE E FULL FACE | CS5FN7 | 538 |
| | | 531 | 2 | TYPE F RAISED FACE | CS5FN7 | 538 |
| | | 531 | 3 | TYPE D RING GROOVE | CS5FN7 | 538 |
| CS5FN1 | | 532 | 1 | NOT APPLICABLE | CS6FN1 | 539 |
| CS5FN2 | | 533 | 1 | NOT APPLICABLE | CS6FN2 | 540 |
| CS5FN3 | | 534 | 1 | NOT APPLICABLE | CS6FN3 | 541 |
| CS5FN4 | | 535 | 1 | NOT APPLICABLE | CS6FN4 | 542 |
| CS5FN5 | | 536 | 1 | NOT APPLICABLE | CS6FN5 | 543 |
| CS5FN6 | | 537 | 1 | NOT APPLICABLE | CS6FN6 | 544 |
| CS5FN7 | | 538 | 1 | NOT APPLICABLE | CS6FN7 | 545 |
| CS6FN1 | | 539 | 1 | NOT APPLICABLE | CS7FN1 | 546 |
| CS6FN2 | | 540 | 1 | NOT APPLICABLE | CS7FN2 | 547 |
| CS6FN3 | | 541 | 1 | NOT APPLICABLE | CS7FN3 | 548 |
| CS6FN4 | | 542 | 1 | NOT APPLICABLE | CS7FN4 | 549 |
| CS6FN5 | | 543 | 1 | NOT APPLICABLE | CS7FN5 | 550 |
| CS6FN6 | | 544 | 1 | NOT APPLICABLE | CS7FN6 | 551 |
| CS6FN7 | | 545 | 1 | NOT APPLICABLE | CS7FN7 | 552 |
| CS7FN1 | | 546 | 1 | NOT APPLICABLE | CS8FN1 | 553 |
| CS7FN2 | | 547 | 1 | NOT APPLICABLE | CS8FN2 | 554 |
| CS7FN3 | | 548 | 1 | NOT APPLICABLE | CS8FN3 | 555 |
| CS7FN4 | | 549 | 1 | NOT APPLICABLE | CS8FN4 | 556 |
| CS7FN5 | | 550 | 1 | NOT APPLICABLE | CS8FN5 | 557 |
| CS7FN6 | | 551 | 1 | NOT APPLICABLE | CS8FN6 | 558 |
| CS7FN7 | | 552 | 1 | NOT APPLICABLE | CS8FN7 | 559 |
| CS8FN1 | | 553 | 1 | NOT APPLICABLE | CS9F1 | 560 |
| CS8FN2 | | 554 | 1 | NOT APPLICABLE | CS9F2 | 561 |
| CS8FN3 | | 555 | 1 | NOT APPLICABLE | CS9F3 | 562 |
| CS8FN4 | | 556 | 1 | NOT APPLICABLE | CS9F4 | 563 |
| CS8FN5 | | 557 | 1 | NOT APPLICABLE | CS9F5 | 564 |
| CS8FN6 | | 558 | 1 | NOT APPLICABLE | CS9F6 | 565 |
| CS8FN7 | | 559 | 1 | NOT APPLICABLE | CS9F7 | 566 |
| CS9F1 | RATING | 560 | 1 | CLASS 150 | CS10FN1 | 567 |
| | | 560 | 2 | CLASS 300 | CS10FN1 | 567 |
| | | 560 | 3 | CLASS 600 | CS10FN1 | 567 |
| | | 560 | 4 | CLASS 900 | CS10FN1 | 567 |
| ... | ... | ... | ... | ... | ... | ... |
| CS9F7 | RATING | 566 | 1 | CLASS 150 | CS10FN1 | 567 |
| | | 566 | 2 | CLASS 300 | CS10FN1 | 567 |
| | | 566 | 3 | CLASS 600 | CS10FN1 | 567 |
| | | 566 | 4 | CLASS 900 | CS10FN1 | 567 |
| | | 566 | 5 | CLASS 1500 | CS10FN3 | 569 |
| | | 566 | 6 | CLASS 2500 | CS10FN4 | 570 |
| CS10FN1 | | 567 | 1 | NOT APPLICABLE | CS11DF | 572 |
| CS10FN2 | | 568 | 1 | NOT APPLICABLE | CS11K | 198 |
| CS10FN3 | | 569 | 1 | NOT APPLICABLE | CS11Q | 201 |
| CS10FN4 | | 570 | 1 | NOT APPLICABLE | CS11BA | 375 |
| CS10FN5 | | 571 | 1 | NOT APPLICABLE | CS11BM | 387 |
| CS11DF | SIZES | 572 | 1 | 15 | | |
| | | 572 | 2 | 20 | | |
| | | 572 | 3 | 30 | | |
| | | 572 | 4 | 40 | | |
| ... | ... | ... | ... | ... | ... | ... |
| | | 572 | 24 | 850 | | |
| | | 572 | 25 | 900 | | |

If a user selects item number 2 (Fittings) from the component menu M2 the user is then presented with type menu CS3B1 from which they are required to select one of the four items. Depending upon which of the four items the user selects, they are then presented with details menu CS4B1, CS4B2, CS4B3 or CS4B4, and so forth. When a user has selected an item from the Size menu, the selection process for that material is complete.

In order to simplify the selection process, where a menu contains only one menu item, such as menu CS5A1, the selection of the single item is made automatically and the next menu is presented to the user.

The items selected in each of the menus are passed to the output means 36.

Whilst the selections made by the user from the menus are sufficient to uniquely identify the material, the number of man-hours required to install the material is predominantly dependent upon the volume and weight of the material, which has not been selected in the menus. However, for each material, the weight and volume are constant and are stored are stored as data in the reference database 10.

The indexing means 30 forms an index for the material based upon the selection made in each component menu M2, detail menu, the rating menu, the schedule menu and the size menu. In this manner, a unique index is formed by simple concatenation of the menu number, e.g. M2, CS4B1 etc and the menu item that is selected from within that menu.

The index is output to the reference means 32 which utilises the index in referencing the reference database 10. The reference database 10 includes weight data, volume data, other data (to be described below) and also includes control data. The data referenced in the reference database 10 are passed to the processing means 34.

The processing means 34 receives the data and depending upon the instruction contained in the control data, processes the data in one of the several ways.

One of the instructions that the control data can include is that the other data in the reference database 10 represents the man-hours required to install the material. This is useful if, because of the nature of the material, the man-hours required to install the material is largely independent of factors such as the height to which the material is to be installed. The processing means 34 responds to this instruction by simply passing the data from the reference database 10, including the man-hours, onto the output means 36.

Alternatively, the control data can include an instruction that the other data in the reference database 10 represents a further index to a formula used to calculate the man-hours required to install the material. In the event of such an instruction, the processing means 34 references the formula from a formulae database 42 using the further index.

In addition, the processing means 34 references a formula adjustment database 44 using the further index. The formula adjustment database 44 contains an adjustment of the formula contained in the formula database 42, which adjustment is provided to make the calculation of the man-hours more accurate based upon past discrepancies between estimates of man-hours and actual man-hour values. Whether or not the processing means 34 references the formula adjustment table 44 is an option selectable by the user.

The processing means 34 calculates, from the formula, the data from the reference database 10 and from any formula adjustment, the man-hours required to install the material and outputs the same and the data from the reference database to the output means 36. The formula for installing different types of materials varies, in terms of whether the relationship between weight, volume and man-hours is linear, exponential or logarithmic and also in terms of whether any constants, such as the slope of the linear relationship, changes. In the case of one type of material the man-hours required to install a material is dependent predominantly upon volume; in another case it is dependent entirely upon volume; in a further case it is dependent entirely upon weight; and in a further case still, it is dependent on a combination of both.

Once the man-hours have been calculated, the processing means 34 outputs the data from the reference database 10 and the man-hours to the output means 36.

The output means 36 receives the selections made by the user from the interface means 28 and the data and the man-hours from the processing means 34 and formats these into a format suitable for the direct cost estimating module 14. In the embodiment, the selections, the data and the man-hours estimate are formatted as a row in a table suitable for inclusion in a spreadsheet-like layout.

Figure 3:
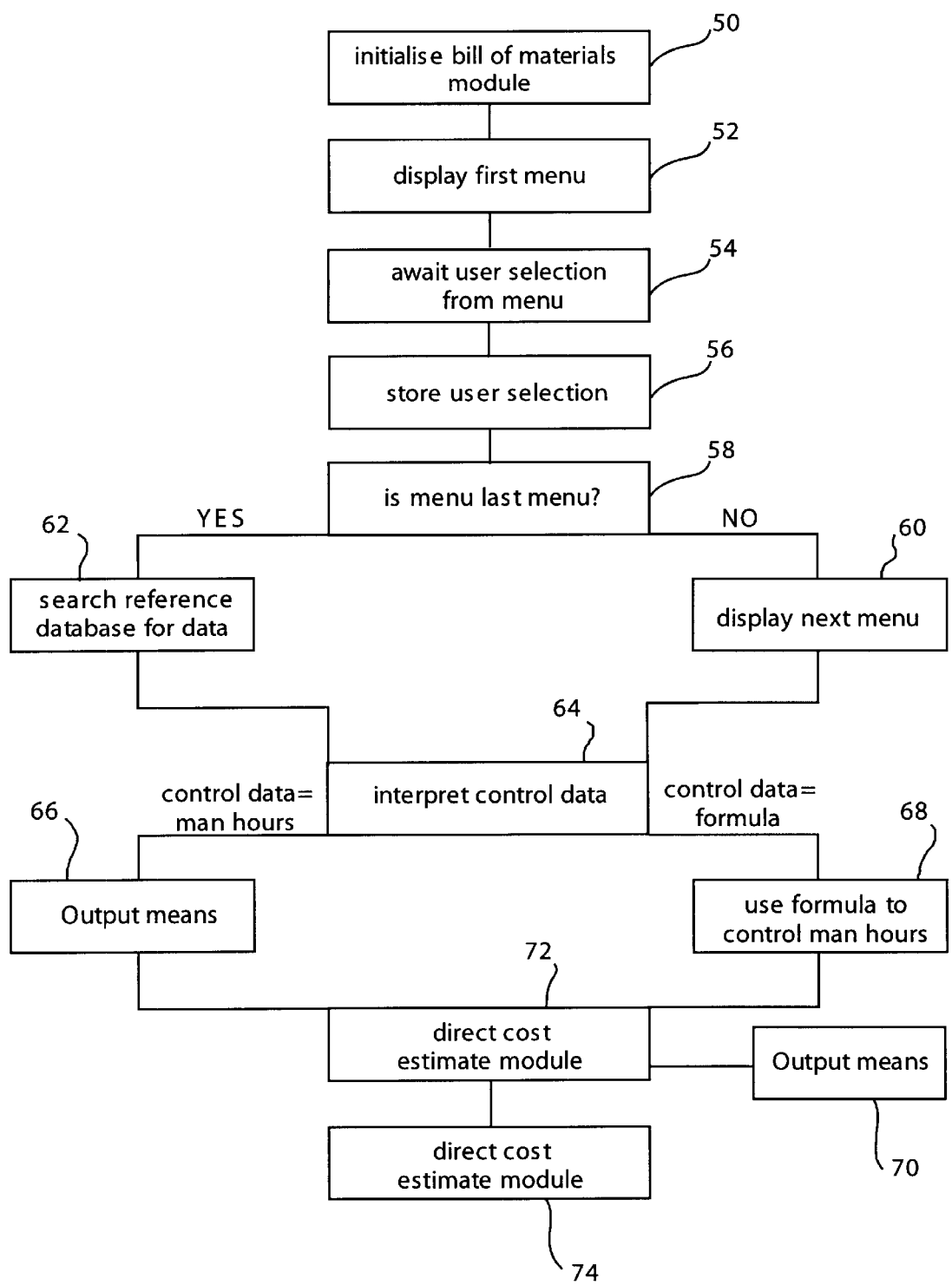
FIG. 3 is a flowchart of the hierarchical relational definition system shown in FIG. 2.

Referring to the flow chart shown in FIG. 3, state box 50 represents initialisation of the bill of materials module 12. Once initialisation is complete, the first menu, component menu M8, is displayed as shown at state box 52 The interface means 28 then waits for the user to make a selection, as shown at state box 54. Once a selection has been made, the selection is stored and if required, the menu and selection are concatenated and stored as part of the index, shown as state box 56.

Next, a comparison is made to determine whether the menu previously displayed was the last menu, shown as state box 58. In the menu was not the last menu, the next menu is determined from the selection made by the user, and the menu is then displayed, as shown in state box 60. The software then waits for the user to again make a selection at state box 54.

If the comparison at state box 58 determines that the previous menu was the final menu, the reference database 10 is searched using the index to locate the data relating to the material, shown at state box 62.

The control data is then interpreted by the processing means 34 as shown at state box 64. If the control data indicates that the other data contained in the reference database 10 represents the man-hours, then the data and the man-hours are simply forwarded to the output means as shown at branch 66.

Alternatively, if the control data indicates that a formula is to be referenced, the other data is used by the processor means 34 to reference the formula database 42 and the formula adjustment database 44 if required. The formula is then evaluated to calculate the man-hours as shown at state box 68. The data obtained from the reference database 10 and the man-hours are then output to the output means 36 as shown at branch 70.

The output means 36 formats the selections, the data and the man-hours into a format suitable for use by the direct cost estimate module 14 as shown at state box 72.

Finally, the software returns to the start 50, as shown at state box 74.

The direct cost estimate module 14 receives the selections, the data and the man-hours estimate from the output means 36 and displays the same in a spreadsheet-like fashion, as a list of materials and man-hours required for the project. The direct cost estimate module 14 includes functions such as copy and paste so that where more than one particular component is required, a user can simply copy and paste a previous selection from the bill of materials module 12 rather than repeating the selection process through the menus.

The direct cost historical database 16 contains a database of previous bills of materials, from which materials and groups of materials are selectable from the direct cost estimate module 14. For example, if a pumping station with a 10 kiloliter per minute capacity is required, the direct cost historical database 16 is referenced to determine whether the same or a similar pumping station has previously been included in a bill of materials and if so, the materials can simply be copied from the previous bill of materials rather than requiring the user to reselect the materials. In addition to saving time by referencing previously used bills of materials, consistency between bills of materials is improved.

Further, the direct cost estimate module 14 references the direct cost adjustment database 17, so that if some materials are copied from a previous bill of materials, the cost of those materials can be updated from the direct cost adjustment database 17, providing a more accurate cost estimate.

The indirect cost estimation module 18 and the indirect cost historical database operate in a similar manner to the direct cost estimation module 14 and the direct cost historical database 16, however the indirect cost estimation module 18 does not reference the bill of materials module 12. The indirect cost estimation module 18 presents a list of possible indirect costs to the user, which the user can then either enter indirect cost values or delete from the list. Once the direct cost and the indirect cost estimates have been completed, the cost estimates are output to the estimate summary 22, which displays the cost estimate information in a variety of levels of detail and formats.

The project cost control module 24 is intended for use when the engineering project is being constructed and is used to schedule the project, for procurement of the materials, and monitoring and management of project costs.

As the actual costs of the engineering project become known, they are entered into the project cost control module 24. At the completion of the project, the actual and estimated information is output to the cost comparison means 25 which creates entries in the direct and indirect cost adjustment databases 17 and 21 corresponding to any difference between the estimated and actual cost for future reference.

In addition, information from the project cost control module 24 is output to a comparison means 46. The comparison means 46 compares, for each material, the estimated man-hours for installation and the actual man-hours for installation. The comparison means 46 adjusts the formula adjustment database 44 for that material to reduce the error between the estimated and actual man-hours value.

It should be appreciated that the scope of the present invention is not limited to the particular embodiment described above.

For example, it is envisaged in other embodiments that the interface means 28 includes a further menu in which a user enters the height at which a material will be installed, which height information is then utilised by the processing means in calculating the man-hours for installation.

Alternatively, it is envisaged that in other embodiments, the control data will contain further instructions which the processing means will interpret as requiring the user to be prompted for information such as the height at which a material will be installed. The height information will then be utilised by the processing means in the formula when calculating the man-hours for installation.

Furthermore, it is envisaged that in further embodiments one or more of the selections are directly passed to the processing means for utilisation in calculating the man-hours required to install the component.

Finally, whilst the embodiment has been described with reference to carbon steel piping to American standard, it should be appreciated that this is an example only of one application of the embodiment and that the embodiment is equally applicable to other types of piping, as well as other material types, such as electrical, electronic, mechanical and structural materials. Where other material types are included, the number of menus and the menu headings vary depending upon the material type.

What is claimed is:

1. A hierarchical relational definition system for defining an output object, comprising:

interface means that sequentially presents a plurality of menus from which selections are made, each selection forming an input parameter, said input parameters corresponding to an input object;

indexing means which forms an index to a database means from at least one of the input parameters;

said database means including fields in which data relating to said input object is stored, one of the fields including control data;

referencing means arranged to reference the database means using the index to obtain therefrom the data relating to the input object;

processing means response to said control data, said control data including instructions to control whether the processing means references a formula and calculates further data relating to said input object; and output means for creating an output corresponding to at least one of the input parameters and/or at least some of the data and the further data, if any, said output defining the output object.

2. A hierarchical relational definition system as claimed in claim 1, wherein each combination of input parameters represents a different input object.

3. A hierarchical relational definition system as claimed in claim 1 or 2, further comprising a formulae database referenced by the processing means to obtain the formula.

4. A hierarchical relational definition system as claimed in claim 3, further comprising a formulae adjustment database, in which adjustments to each formula in the formulae database are stored, said processing means also referencing said formulae adjustment database when calculating the further data.

5. A hierarchical relational definition system as claimed in claim 4, further comprising a comparison means, responsive to the output and to actual data provided by a user corresponding to actual values of the further data, the comparison means altering the adjustment in the formulae adjustment database corresponding to the input object so as to reduce any difference between the actual data and the further data.

6. A hierarchical relational definition system as claimed in any one of the preceding claims, wherein the processing means is also responsive to at least one of the input parameters and/or at least some of the data when calculating the further data.

7. A hierarchical relational definition system as claimed in any one of the preceding claims, wherein only one selection is made from each menu.

8. A hierarchical relational definition system as claimed in any one of the preceding claims, wherein the index is formed from a plurality of the input parameters.

9. A hierarchical relational definition system as claimed in claim 8, wherein the index is formed from the concatenated values of the plurality of input parameters.

10. A hierarchical relational definition system as claimed in claim 4, wherein the database means and the formula adjustment database each comprise a table.

11. A hierarchical relational definition system as claimed in any one of the preceding claims, wherein the output means comprises table generation means which produces a table comprising at least one row, each row corresponding to an object and containing the input parameters and the further data.

12. A hierarchical relational definition system as claimed in claim 1, wherein the control data includes information as to whether a user is to be asked to enter data relating to the output object.

13. A hierarchical relational definition system as claimed in claim 1, wherein the control data includes information as to whether a field in said database means comprises the further data for the output object or a further index to be used in referencing the formula.

14. A method for defining an object, comprising the steps of:

sequentially presenting a plurality of menus from which selections are made;

forming an index to a database from at least one of the selections;

referencing said database using the index to obtain therefrom data relating to the object, some of said data being control data;

determining from said control data whether to reference a formula to calculate further data relating to the object, and if so, referencing said formula and calculating said further data; and presenting at least one of the selections and/or at least some of the data and the further data, if any, as an output, wherein the output defines the object.

15. A method for defining an object as claimed in claim 14, including the step of referencing a formulae adjustment database to obtain therefrom an adjustment for said formula, which is utilised in calculating the further data.

16. A method for defining an object as claimed in claim 15, including the step of comparing the further data with an actual value provided by a user, and on the basis of the comparison altering the adjustment corresponding to the object to reduce the difference between the further data and the actual value.

17. A method for defining an object as claimed in claim 14, 15 or 16, wherein the index is formed from a plurality of the selections.

18. A method for defining an object as claimed in any one of claims 14 to 17, including the step of requesting a user to enter data relating to the object if indicated to do so by the control data.

19. A cost estimate system comprising:

means for producing a direct cost estimate; and means for producing an indirect cost estimate, including a hierarchical relational definition system according to claim 1.

* * * * *